US006244140B1

(12) United States Patent
Habermehl

(10) Patent No.: US 6,244,140 B1
(45) Date of Patent: *Jun. 12, 2001

(54) SCREWDRIVER WITH SHOE GUIDED SLIDE BODY

(76) Inventor: G. Lyle Habermehl, 436 Calvert Dr., Gallatin, TN (US) 37066

(*) Notice: Subject to any disclaimer, the term of this patent is extended or adjusted under 35 U.S.C. 154(b) by 0 days.

This patent is subject to a terminal disclaimer.

(21) Appl. No.: 09/517,771

(22) Filed: Mar. 3, 2000

Related U.S. Application Data

(63) Continuation of application No. 09/313,848, filed on May 18, 1999, now Pat. No. 6,089,132, which is a continuation of application No. 08/882,323, filed on Jun. 25, 1997, now Pat. No. 5,934,162, which is a continuation-in-part of application No. 08/673,398, filed on Jun. 28, 1996, now Pat. No. 5,927,163, which is a continuation-in-part of application No. 08/511,945, filed on Aug. 7, 1995, now Pat. No. 5,568,753, which is a continuation-in-part of application No. 08/233,090, filed on Apr. 25, 1994, now abandoned, which is a continuation-in-part of application No. 08/198,129, filed on Feb. 17, 1994, now Pat. No. 5,469,767, which is a continuation-in-part of application No. 08/018,897, filed on Feb. 17, 1993, now Pat. No. 5,337,635.

(51) Int. Cl.⁷ ....................................................... B25B 23/06
(52) U.S. Cl. ............................................. 81/434; 227/136
(58) Field of Search ................................. 81/57.37, 434; 227/136

(56) References Cited

U.S. PATENT DOCUMENTS

| | | |
|---|---|---|
| 1,815,594 | 7/1931 | Shaw et al. . |
| 3,550,831 | 12/1970 | Obergfell . |

(List continued on next page.)

FOREIGN PATENT DOCUMENTS

| | | |
|---|---|---|
| 2750562 | 5/1979 | (DE) . |
| 3144248 | 5/1983 | (DE) . |
| 4119925 | 1/1992 | (DE) . |
| 738564 | 10/1996 | (EP) . |
| 2132531 | 7/1984 | (GB) . |
| 2147873 | 5/1985 | (GB) . |

OTHER PUBLICATIONS

Quik Drive "Screwdrivers Attachment" for Model Nos. 3301 and 3303, No Date.

*Primary Examiner*—James G. Smith
(74) *Attorney, Agent, or Firm*—Dorsey & Whitney LLP

(57) ABSTRACT

A screwdriver for driving collated screws including a slide body coupled to a housing for reciprocal displacement in a cycle including a retraction stroke and an extension stroke. A lever pivotably mounted to the slide body carries at one end a cam pin received in a cam slot in the housing with the other end of the lever advancing successive screws in the screwstrip, the cam slot having first and second camming surfaces for selective engagement by the cam pin to vary the relative positioning of the lever to be different for the same position if the slide body in the housing in the retraction strokes than in the extension stroke.

65 Claims, 27 Drawing Sheets

U.S. PATENT DOCUMENTS

| | | |
|---|---|---|
| 3,601,168 | 8/1971 | Farnstrom . |
| 3,623,646 | 11/1971 | Cast . |
| 3,826,419 | 7/1974 | Maestri . |
| 3,910,324 | 10/1975 | Nasiatka . |
| 3,930,297 | 1/1976 | Potucek . |
| 4,014,225 | 3/1977 | Lejdegard . |
| 4,018,254 | 4/1977 | DeCaro . |
| 4,146,071 | 3/1979 | Mueller et al. . |
| 4,167,229 | 9/1979 | Keusch . |
| 4,367,837 | 1/1983 | Manino . |
| 4,404,877 | 9/1983 | Mizuno et al. . |
| 4,428,261 | 1/1984 | Takatsu et al. . |
| 4,581,964 | 4/1986 | Takatsuru . |
| 4,625,597 | 12/1986 | Cast . |
| 4,930,630 | 6/1990 | Habermehl . |
| 4,998,452 | 3/1991 | Blum . |
| 5,027,679 | 7/1991 | Kawashima . |
| 5,083,483 | 1/1992 | Takagi . |
| 5,167,174 | 12/1992 | Fujiyama et al. . |
| 5,186,085 | 2/1993 | Monacelli . |
| 5,231,900 | 8/1993 | Deri . |
| 5,284,074 | 2/1994 | Chen . |
| 5,303,620 | 4/1994 | Payne et al. . |
| 5,337,635 | 8/1994 | Habermehl . |
| 5,339,713 | 8/1994 | Hou . |
| 5,341,706 | 8/1994 | Takagi . |
| 5,402,695 | 4/1995 | Hornung . |
| 5,452,630 | 9/1995 | Haas . |
| 5,469,767 | 11/1995 | Habermehl . |
| 5,473,965 | 12/1995 | Chen . |
| 5,531,142 | 7/1996 | Adamo . |
| 5,542,323 | 8/1996 | Habermehl . |
| 5,568,753 | 10/1996 | Habermehl . |
| 5,570,618 | 11/1996 | Habermehl . |

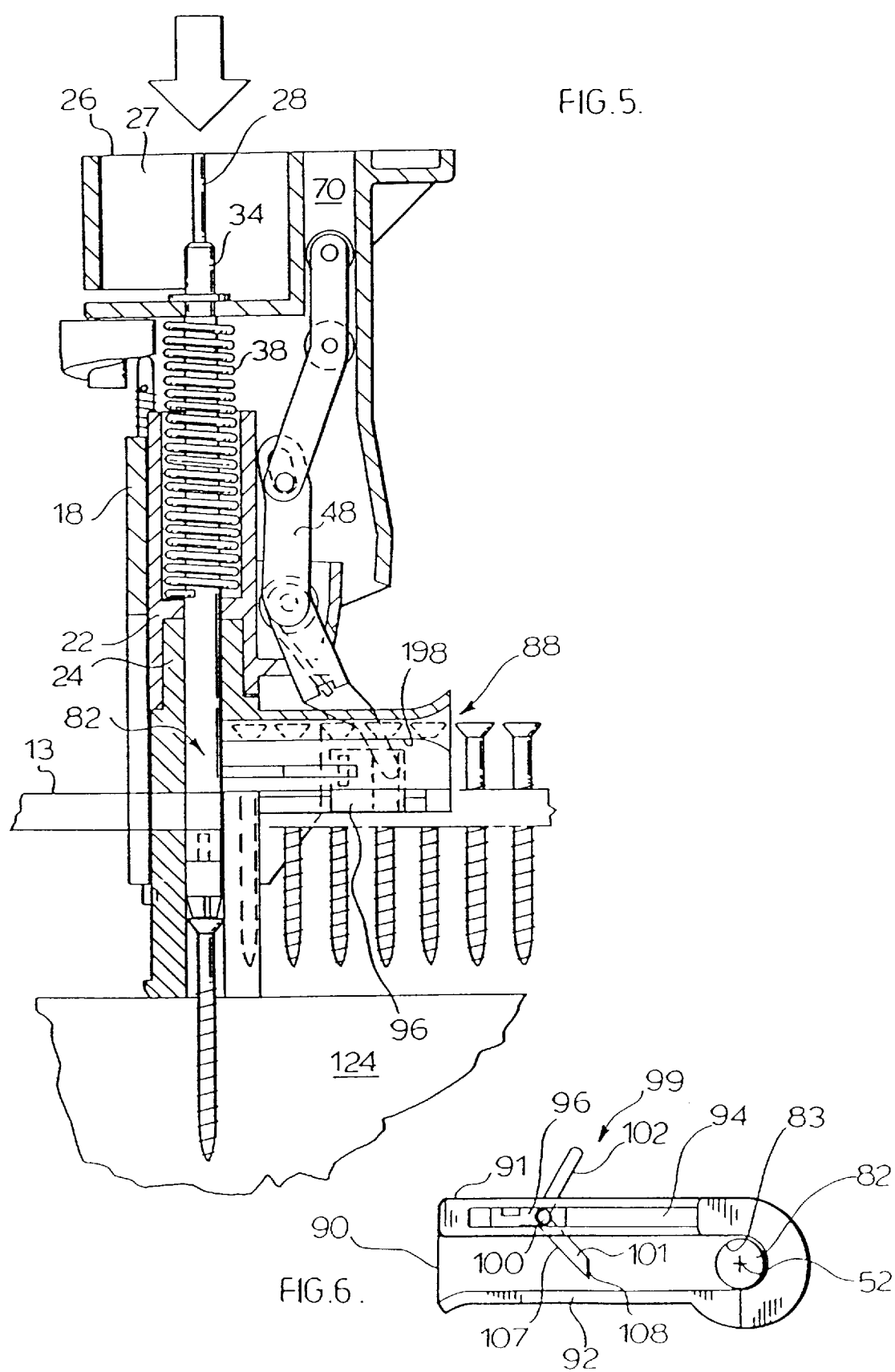

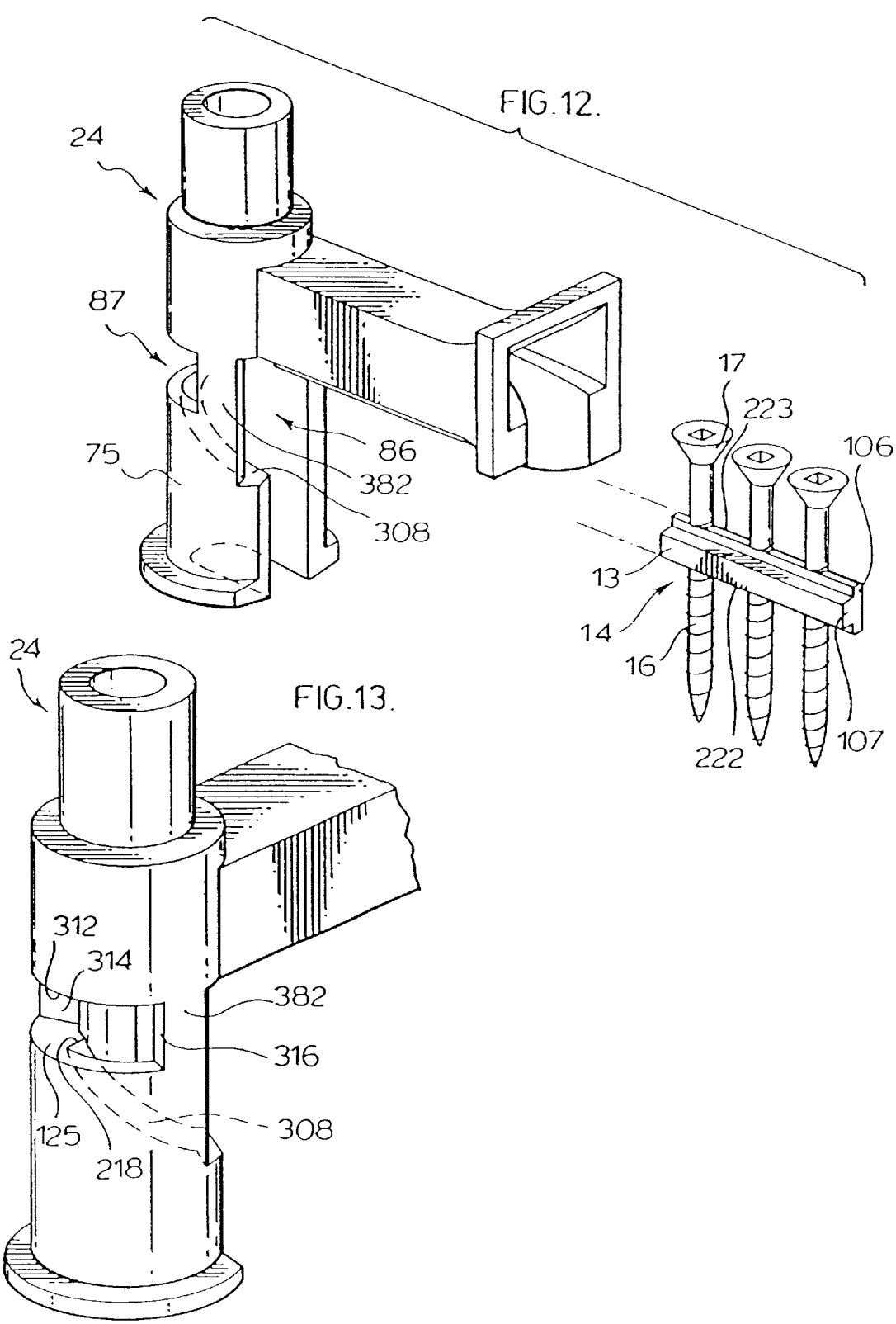

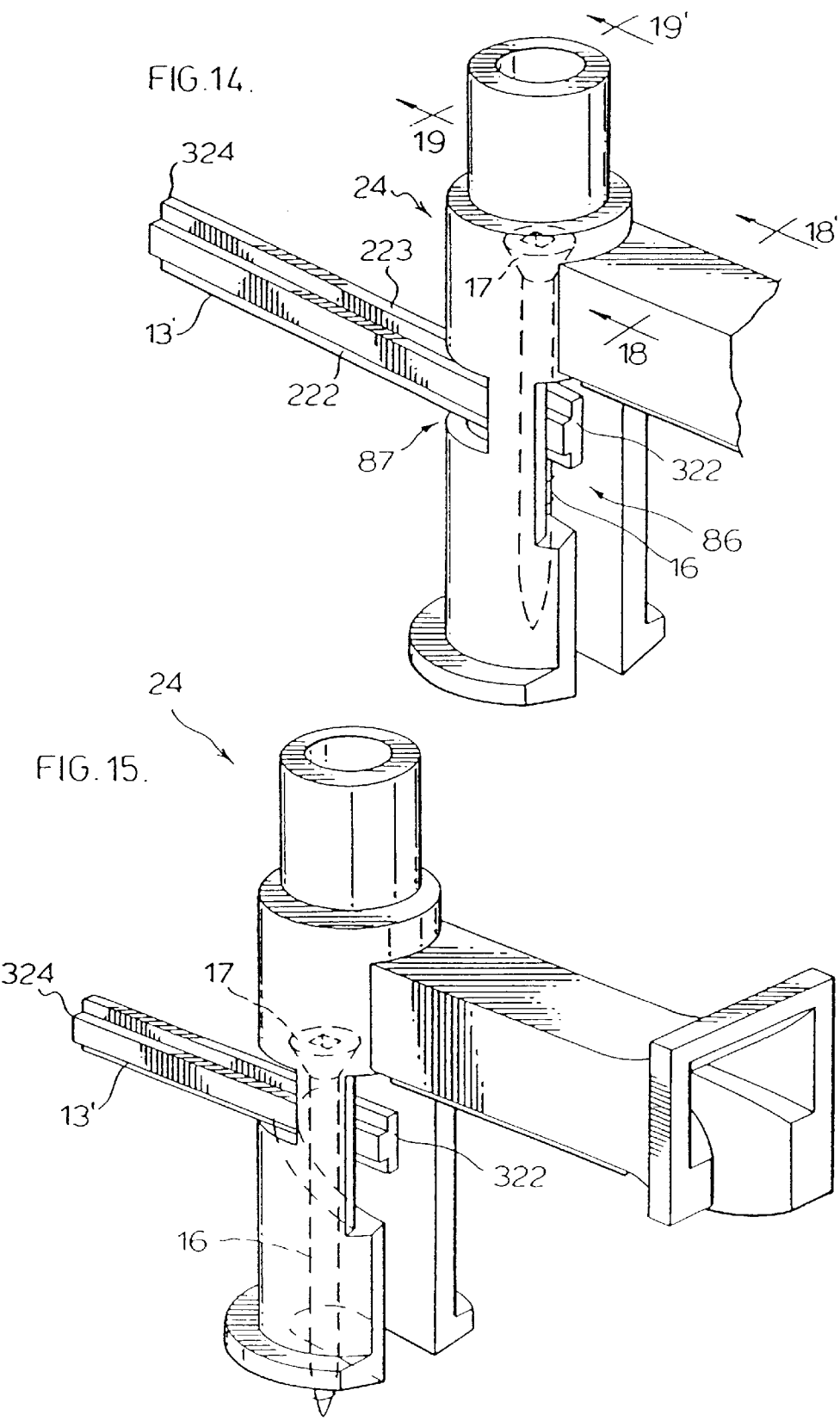

FIG. 36.
FIG. 37.
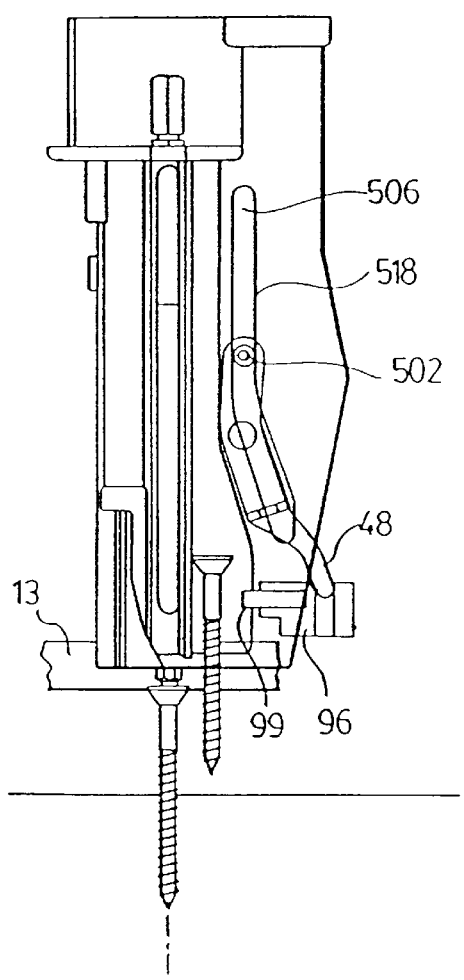
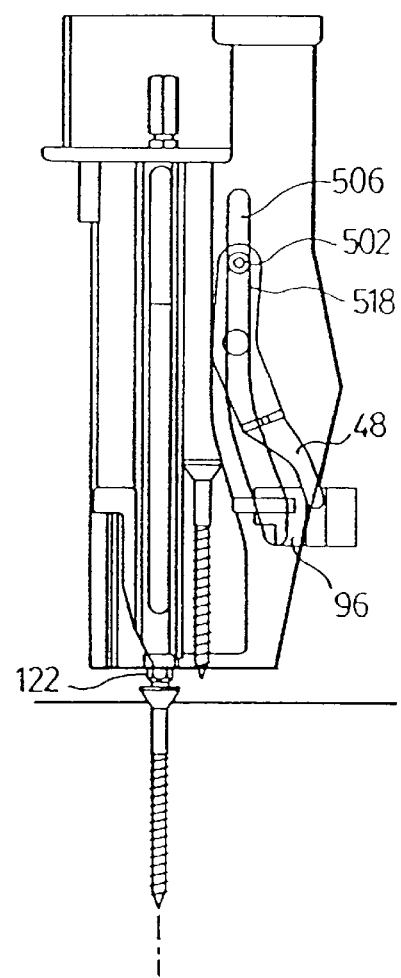

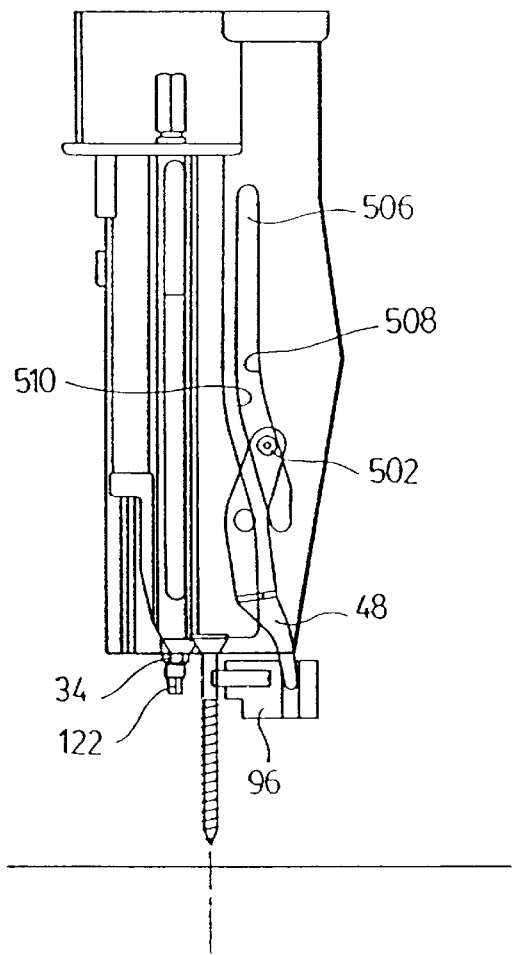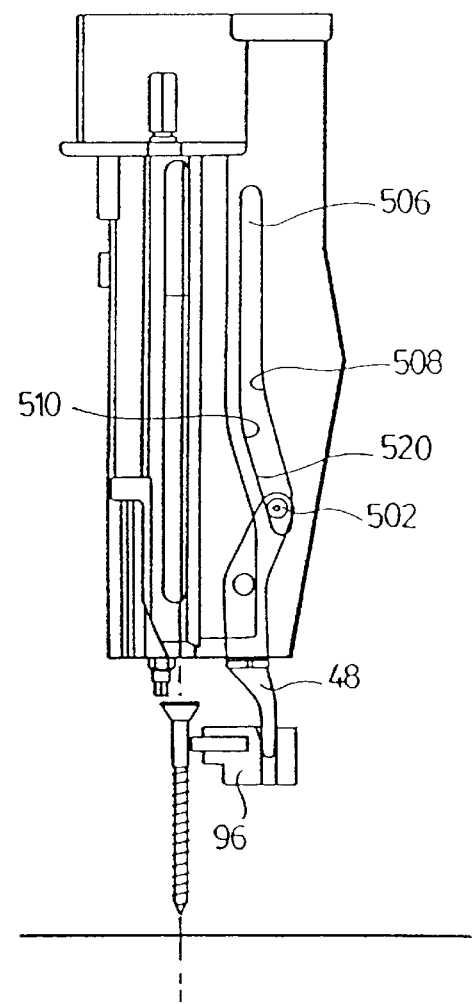

SCREWDRIVER WITH SHOE GUIDED SLIDE BODY

RELATED APPLICATIONS

This application is a continuation of U.S. patent application Ser. No. 09/313,848, filed May May 18, 1999 U.S. Pat. No. 6,089,132, which is a continuation of U.S. patent application Ser. No. 08/882,323, filed Jun. 25, 1997, which is a continuation-in-part of U.S. patent application Ser. No. 08/673,398, filed Jun. 28, 1996, which is a continuation-in-part of U.S. patent application Ser. No. 08/511,945, filed Aug. 7, 1995, which is a continuation-in-part of U.S. patent application Ser. No. 08/233,090, filed Apr. 25, 1994, which is a continuation-in-part of U.S. patent application Ser. No. 08/198,129, filed Feb. 17, 1994, which is a continuation-in-part of U.S. patent application Ser. No. 08/018,897, filed Feb. 17, 1993, all of which are incorporated herein by reference.

SCOPE OF THE INVENTION

This invention relates generally to a screwdriver for driving collated screws which are joined together in a strip, and, more particularly, to a power screwdriver with a nose portion which renders the screwdriver adaptable for use in driving screws having different lengths and diameter screw heads.

BACKGROUND OF THE INVENTION

Collated screwstrips are known in which the screws are connected to each other by a retaining strip of plastic material. Such strips are taught, for example, by U.S. Pat. No. 4,167,229 issued Sept. 11, 1979 and its related Canadian Patents 1,040,600 and 1,054,982 as well as U.S. Pat. No. 4,930,630, the disclosures of which are incorporated herein by reference. Screws carried in such screws strips are adapted to be successively incrementally advanced to a position in alignment with and to be engaged by a bit of a reciprocating, rotating power screwdriver and screwed into a workpiece. In the course of the bit engaging the screws and driving it into a workpiece, the screw becomes detached from the plastic strip leaving the strip as a continuous length.

In the use of such collated screwstrips in screwdrivers, the strip serves a function of assisting in guiding the screw into a workpiece and, to accomplish this, the strip is retained against movement towards the workpiece. In the screwstrip, each screw to be driven has its threaded shaft threadably engaged in a threaded sleeve of the strip such that on the screwdriver engaging and rotating each successive screw, the screw turns within the sleeve which acts to guide the screw as it moves forwardly into threaded engagement into the workpiece. Preferably, only after the tip of the screw becomes engaged in the workpiece, does the head of the screw come into contact with the sleeves. Further, forward movement of the screw into the workpiece then draws the head downwardly to engage the sleeve and to rupture the sleeve by reason of the forward movement of the head with the strip retained against movement towards the workpiece. The sleeve preferably is configured to have fragile strips which break on the head passing through the sleeve such that the strip remains intact as a continuous length. Since the strip is a continuous length, on advancing the screwstrip with each successive screw to be driven, it necessarily results that portion of the strip from which each screw has been driven are also advanced to exit from the power screwdriver.

Known power screwdrivers for driving such collated screwstrips include U.S. Pat. No. 4,146,071 to Mueller et al, issued Mar. 27, 1976, and U.S. Pat. No. 5,186,085 to Monaceli, issued Feb. 16, 1993, the disclosure of which are incorporated herein by reference. Such known power screwdrivers include a rotatable and reciprocally moving screwdriver shaft which is turned in rotation by an electric motor. A screwdriving bit forms a forwardmost portion of the shaft for engaging the head of each successive screw as each screw is moved into a driving position, axially aligned under the screwdriver shaft.

An important aspect of such power screwdriver is the manner and accuracy with which the screws are advanced and positioned so as to be properly aligned axially under the screwdriver shaft for successful initial and continued engagement between the bit and the screwdriver head in driving a screw fully down into a workpiece. In the device of Mueller et al, a guide channel is provided through which the screwstrip is advanced. The guide channel is sized to receive screws of specific head size and minimum length. The guide channel is formed as an integral part of a sliding body which also carries other components of a screw advance mechanism including a feed pawl to engage the screwstrip and thereby advance successive screws in the screwstrip. The screws are successively advanced into position in alignment with the screwdriver shaft with the heads of the screws being urged into abutment with a stop which is to locate the screw head. The stop typically defines a radial extent of a boreway through which the shaft and screw head axially move as the screw is driven.

The shaft is axially movable in the boreway in a reciprocal manner to engage the screw and drive it into a workpiece. After each screw is driven the shaft retracts and a subsequent screw carried on the screwstrip is advanced sideways into the boreway, engaging the stop so as to be aligned under the shaft.

Known power drivers for collated screws have a slide body which is reciprocally slidable relative a housing in a normal cycle of operation. Known screw advance mechanisms are coupled between the slide body and housing to translate relative movement of the slide body and housing into a cyclical cycle of advance of the screwstrips.

Known screw advance mechanisms suffer the disadvantage that they are complex and typically involve a number of components. For example, in the device of Mueller et al, U.S. Pat. No. 4,146,071, the advance mechanism comprises three interrelated lever members together with a camming roller which cams on a camming surface. A primary spring biases the slide body to an extended position relative the housing. A secondary spring biases the lever members to urge the roller into the camming surface and the screwstrip towards the fully advanced position. The secondary spring has the disadvantage of being relatively strong and requiring substantial additional forces for operation so as to telescope the slide body into the housing and overcome the additional frictional forces developed between the camming roller and the camming surfaces.

Known screwstrip advance mechanisms are unduly complex, expensive to manufacture, cumbersome, bully and inconsistent in their features with a lightweight tool of minimum size.

SUMMARY OF THE INVENTION

To at least partially overcome these disadvantages of the prior art, the present invention provides a screwdriver for driving collated screws including a slide body coupled to a housing for reciprocal displacement in a cycle including a retraction stroke and an extension stroke, a lever pivotably mounted to the slide body carries at one end a cam pin received in a cam slot in the housing with the other end of the lever advancing successive screws in the screwstrip, the cam slot having first and second camming surfaces for selective engagement by the cam pin to vary the relative positioning of the lever to be different for the same positions of the slide body in the housing in the retraction strokes than in the extension stroke.

An object of the present invention is to provide a simplified arrangement for translating relative positioning of the slide body and the housing into positioning of the screw advance mechanism, yet permitting for different positions in an extension stroke versus a retraction stroke.

Another object is to provide in an attachment for driving collated screws an enhanced sequencing of relative positioning of the screw to be driven, the next screw to be driven and the mandrel in cyclical steps of advancing and driving each screw.

Accordingly, in one aspect the present invention provides an apparatus for driving with a power driver a screwstrip comprising threaded fasteners, such as screws or the like, which are joined together in a strip comprising:

a housing;

an elongate driver shaft for operative connection to a power driver for rotation thereby and defining a longitudinal axis;

a slide body coupled to the housing for displacement parallel to the axis of the driver shaft between an extended position and a retracted position;

the slide body having a guide channel for said screwstrip transverse to the axis, a shuttle carried on the slide body movable relative the slide body transverse to the axis towards and away from the axis, the shuttle carrying pawl means for engagement with the screwstrip to advance the screwstrip with movement of the shuttle towards the axis to place successive of the fasteners into axial alignment with the driver shaft for driving by the driver shaft, a lever having a first end coupled to the shuttle and a second end coupled to the housing whereby movement of the slide body axially relative the housing (a) towards the extended position moves the shuttle towards the axis and (b) away from the extended position moves the shuttle away from the axis, the lever pivotably mounted on the slide body intermediate its first and second ends;

the housing having an elongate cam slot having side-by-side first and second camming surfaces, the second end of the lever carrying a cam pin member slidably engaged in the cam slot between the first and second camming surfaces;

the slide body moving relative the housing in a cycle of operation in which the slide body moves in a retracting stroke from the extended position to the retracted position and then moves in an extending stroke from the retracted position to the extended position, in at least some identical relative positions of the slide body and housing, the pin member engages the first camming surface in the retracting stroke and the second camming surfaces in the extending stroke such that the lever places the shuttle at different positions relative the identical positions of the slide body and housing in a retracting stroke than in an extending stroke.

BRIEF DESCRIPTION OF THE DRAWINGS

Further aspects and advantages of the present invention will appear from the following description taken together with the accompanying drawings, in which:

FIG. 5 is a view identical to FIG. 4 but with the drive attachment in a partially retracted position in driving a screw into a workpiece;

FIG. 6 is an end view of the nose portion of FIG. 2;

FIG. 12 is a schematic pictorial view of a second version of a removable nose portion;

FIG. 13 is a partially cut-away pictorial view of the nose portion of FIG. 12 from a different perspective;

FIGS. 14, 15, 16 and 17 are similar views of the nose portion of FIG. 12 shown with the last screw in a strip in successive positions as it is driven from the nose portion;

FIGS. 31 to 41 are side views of the driver attachments of FIGS. 29 and 30 showing the attachment in successive positions in a cycle of operation, with FIG. 31 showing the attachment in a fully extended position and FIG. 38 showing the attachment in the fully retracted position.

DETAILED DESCRIPTION OF THE DRAWINGS

Figure 1:
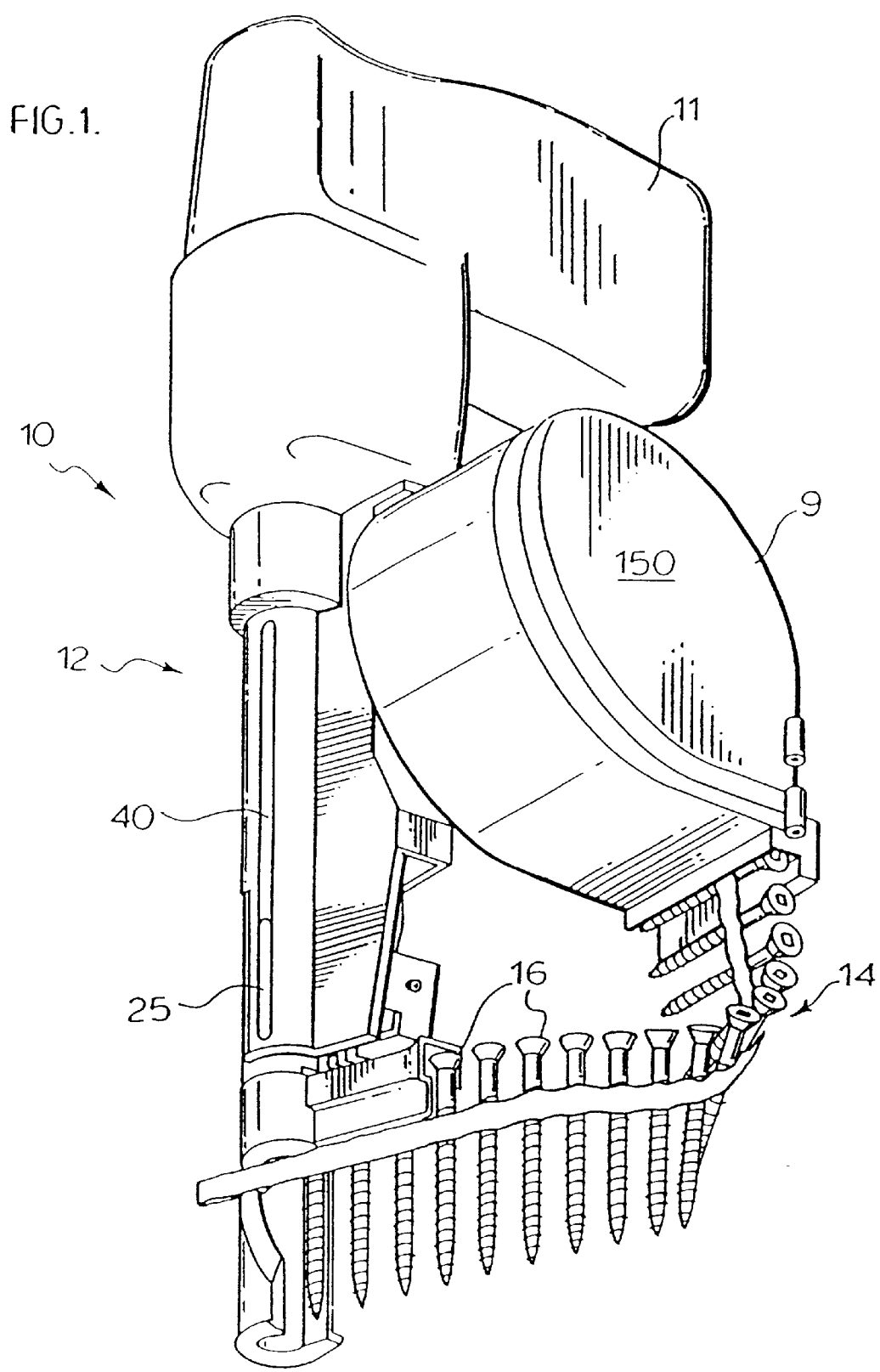
FIG. 1 is a pictorial view of a power screwdriver in accordance with a first preferred embodiment of the present invention.

Reference is made to FIG. 1 which shows a complete power screwdriver assembly 10 in accordance with the present invention. The assembly 10 comprises a power driver 11 to which a driver attachment 12 is secured. The driver attachment 12 carries a cartridge 9 containing a coil of a collated screwstrip 14 with spaced screws 16 to be successively driven.

Figure 2:
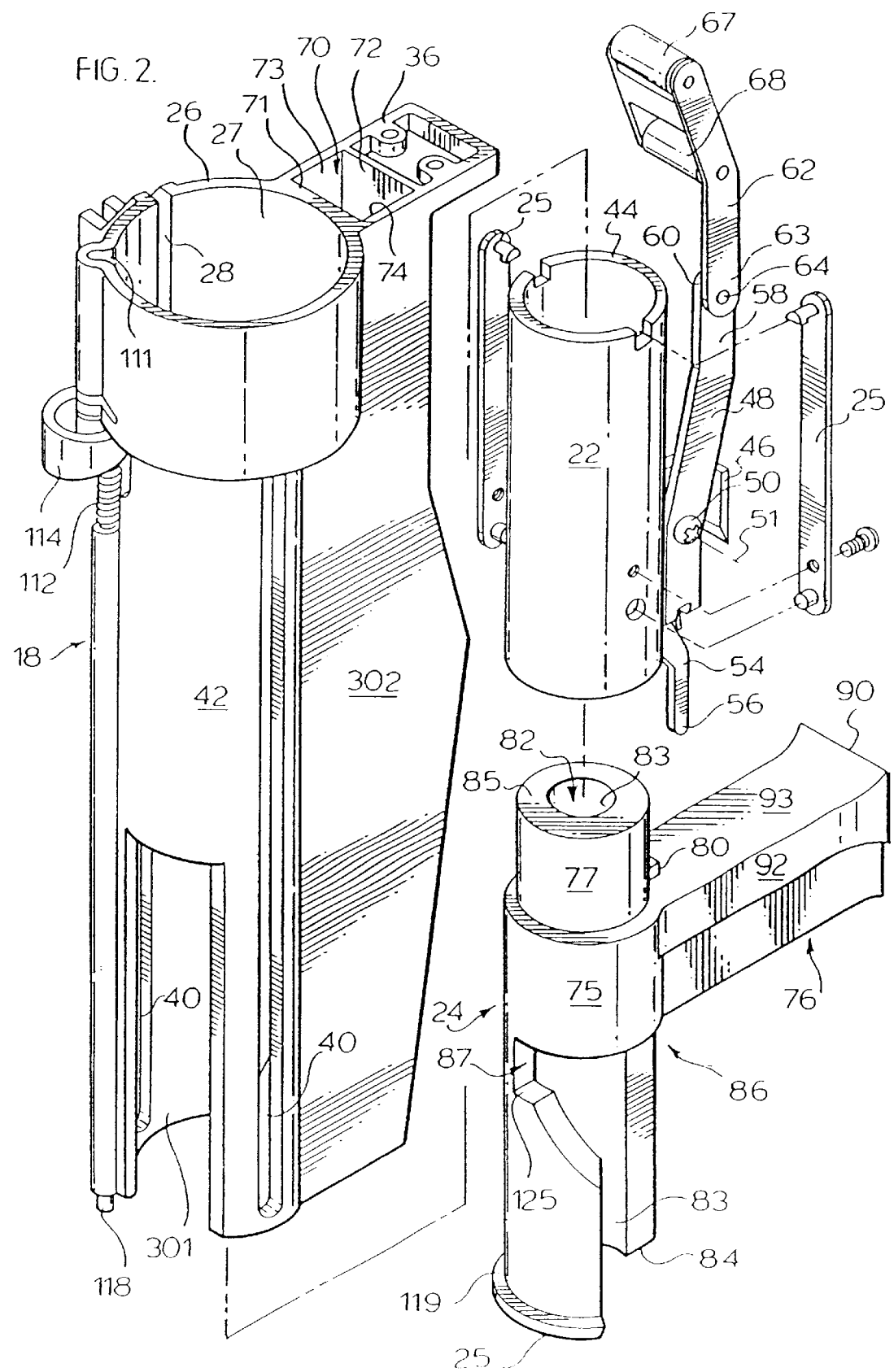
FIG. 2 is an exploded pictorial view of the housing and slide body shown in FIG. 1.
Figure 4:
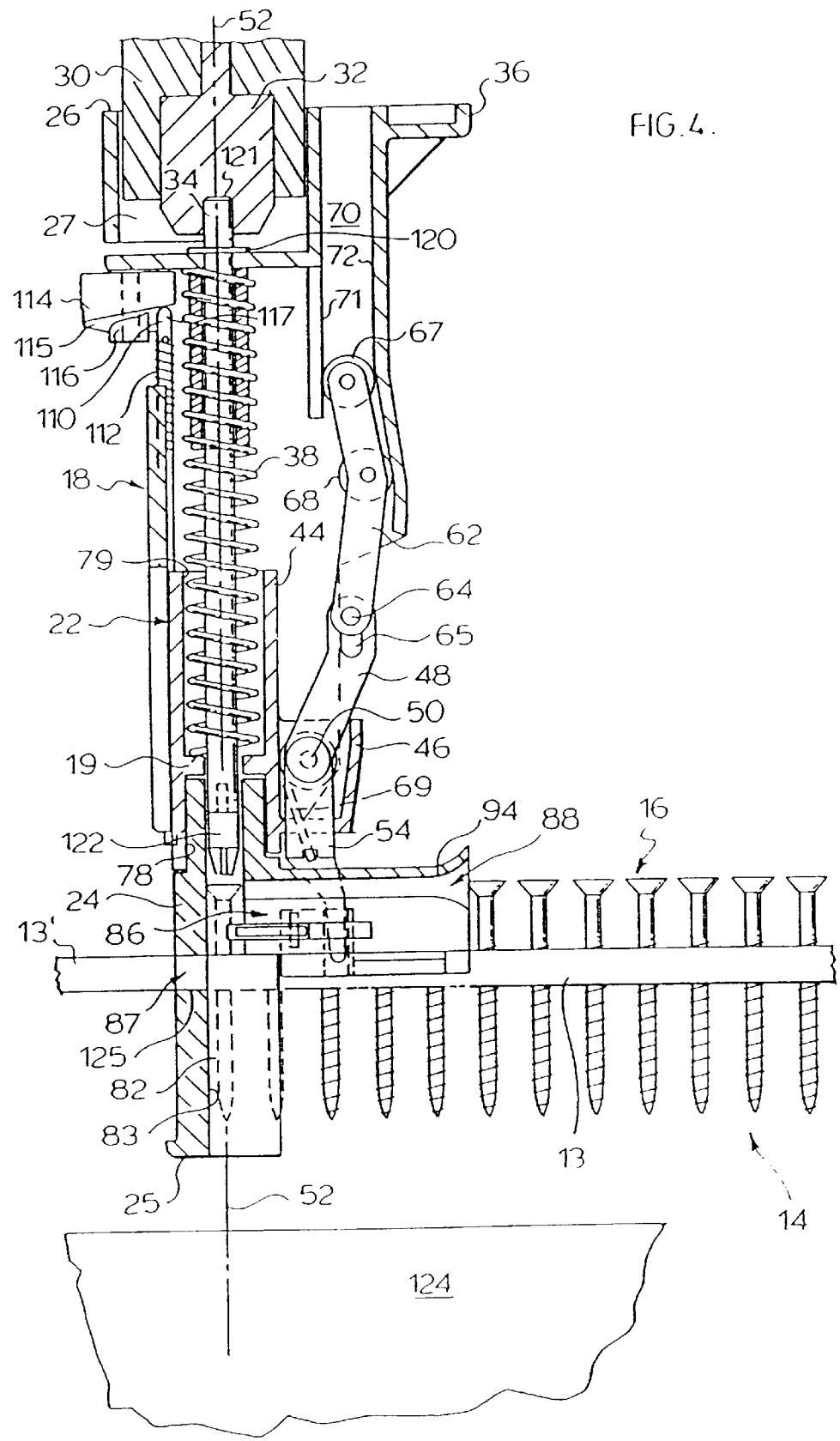
FIG. 4 is a schematic partially cross-sectional view of the driver attachment of FIG. 1 in a fully extended position as seen in FIG. 1 through a plane passing through the longitudinal axis of the drive shaft and centrally of the screws in the screwstrip.

Reference is made to FIG. 2 showing an exploded view of major components of the driver attachment 12 as housing 18 and a slide body comprising a rear portion 22 and a removable nose portion 24. FIGS. 4 and 5 show in cross-section the interaction of these components.

As seen in FIG. 4, the rearmost end 26 of the housing 18 has a rearwardly directed socket 27 with a longitudinal slot 28 in its side wall to receive and securely clamp the housing 18 onto the housing 30 of the power driver 11 so as to secure the housing 18 of the driver attachment to the housing 30 of the power driver against relative movement. The power driver 11 has a chuck 32 rotatable in the driver housing 30 by an electric motor (not shown). The chuck 32 releasably engages the driver shaft 34 in known manner. The housing 18 is provided with a lateral flange 36 at its rear end to which a known screwstrip containing cartridge 9 is secured in a conventional manner.

As seen in FIG. 4, the slide body 20 is slidably received in the housing 18 with the driver shaft 34 received in a bore passing through the rear portion 22 and nose portion 24 of the slide body 20. A compression spring 38 disposed between the housing 18 and the rear portion 22 coaxially about the driver shaft 34 biases the slide body away from the housing 18 from a retracted position towards an extended position. As shown, the spring 38 is disposed between the housing 18 and the rear portion 22. Slide stops 25, best shown in FIG. 2, are secured to the rear portion 22 of the slide body. Two slide stops 25 slide in two longitudinal slots 40 on each side of the part cylindrical side wall 42 of the housing 18 to key the rear portion 22 of the slide body to the housing 18 against relative rotation and to prevent the slide body being moved out of the housing 18 past a fully extended position.

The rear portion 22 comprises a generally cylindrical element 44 with a radially extending flange element 46 on one side. A lever 48 is pivotally mounted to the flange element 46 by bolt 50 for pivoting about an axis 51 of bolt 50 normal to a longitudinal axis 52 which passes centrally through the drive shaft 34 and about which the drive shaft is rotatable. Lever 48 has a forward arm 54 extending forwardly to its front end 56 and a rear arm 58 extending rearwardly to its rear end 60. A cam follower 62 has its forward end 63 mounted to the rear end 60 of the rear arm 58 by a bolt 64 being received in a slot 65 extending longitudinally in the rear end of the rear arm 58. The cam follower 62 has at its rear end 66 two cam rollers 67 and 68 rotatable on pins parallel to the axis of bolts 50 and 64.

As seen in FIGS. 2 and 4, the housing 18 carries a camming channel 70 in which the cam rollers 67 and 68 are received. The camming channel 70 is disposed to one side of the driver shaft 34 and extends generally parallel thereto. The camming channel 70 has opposed camming surfaces 71 and 72 at least partially closed by side walls 73 and 74.

The camming channel 70 extends rearwardly beside the socket 27 of housing 18 and thus rearwardly past the chuck 32 of the power driver 11 to one side thereof. This configuration permits the use of a housing 18 which is of a lesser length parallel longitudinal axis 52 for a given length of the cam follower 62 and of the lever 48, rearward of bolt 50.

A spring 69 wound about bolt 50 is disposed between the flange element 46 and the forward arm 54 of the lever 48 to bias the lever in a clockwise direction as seen in FIG. 4. The effect of spring 69 is to urge the cam roller 67 into engagement with cam surface 71 and to urge cam roller 68 into engagement with cam surface 72.

With relative sliding of the slide body 20 and the housing 18 between the extended and the retracted positions, the cam follower 62 translates the relative movement and positioning of the slide body 20 and housing 18 into relative pivoting and positioning of the lever 48 about the axis 51. The ability of bolt 64 to slide longitudinally in the longitudinal slot 65 provides a lost motion linkage as is known and is advantageous such that the relative timing of pivoting of the lever 48 varies as compared to the relative location of the slide body 20 and housing 18 in moving towards an extended position as contrasted with moving towards a retracted position.

The nose portion 24 has a generally cylindrical screw guide element or guide tube 75 arranged generally coaxially about longitudinal axis 52 and a flange-like screw feed channel element 76 extending radially from the guide tube 75.

Figure 7:
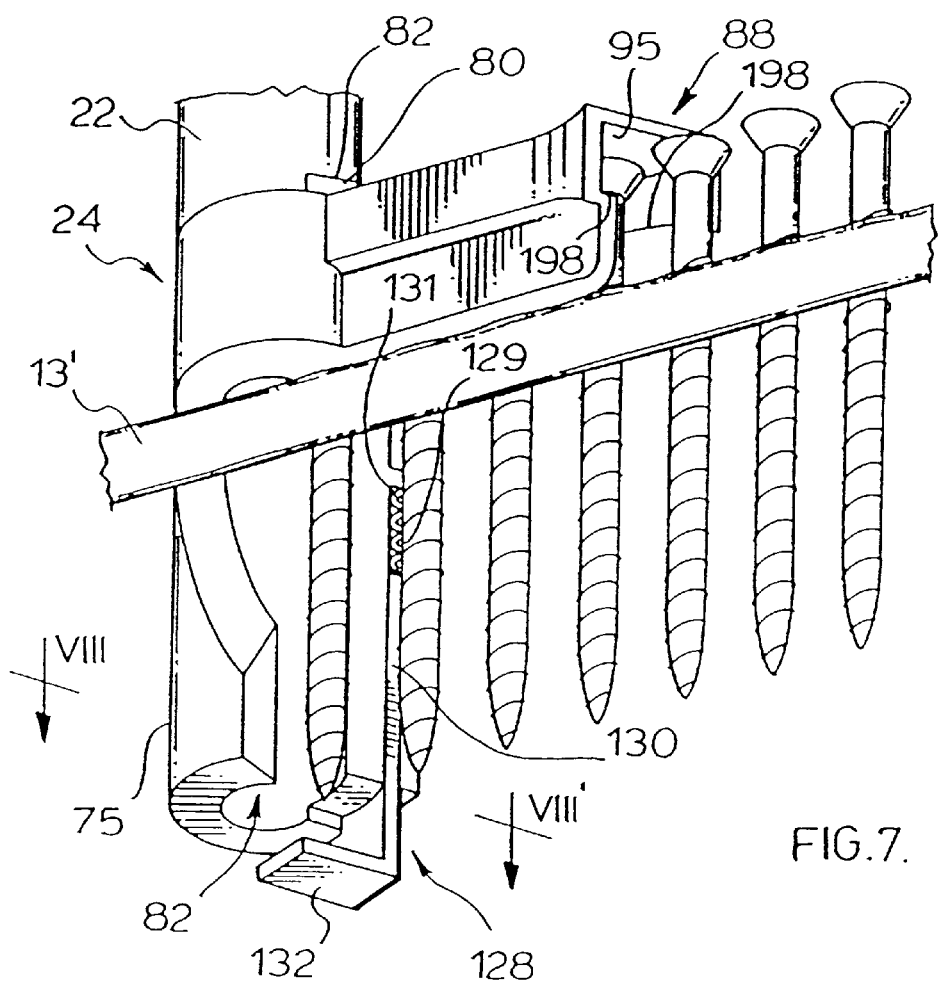
FIG. 7 is a pictorial view of the nose portion shown in FIG. 2 but modified in accordance with a second embodiment of the invention to provide a retractable screw locating plate.

The guide tube 75 has a cylindrical portion 77 at its rear end with a cylindrical exterior surface sized to be closely received, preferably in a friction fit, within a forwardly opening cylindrical bore 78 in the forward end of the rear portion 22. A radially extending key 80 is provided to extend from the cylindrical portion 77 of the nose portion 24 to be received in a correspondingly sized keyway slot 82 in the rear portion 22 as best seen in FIGS. 4 and 7 to secure the nose portion 24 to the rear portion 22 against relative pivoting about the longitudinal axis 52.

The guide tube 75 has a cylindrical bore or guideway 82 extending axially through the guide tube with the guideway 82 delineated and bordered by a radially extending cylindrical side wall 83 and open at its forward axial end 84 and at its rearward axial end 85.

The guide tube 75 has a rearward section adjacent its rear end 85 in which the side wall 83 extends 360° about the guideway 82. Forward of the rearward section, the guide tube has a forward section best seen in FIG. 4 and which has an access opening 86, shown in the drawings as being on the right hand side of the guide tube 75. Screw access opening 86 is provided to permit the screwstrip 14 including retaining strip 13 and screws 16 to move radially inwardly into the guideway 82 from the right as seen in FIGS. 4 and 5. Each screw preferably has a head 17 with a diameter marginally smaller than the diameter of the side wall 83. It follows that where the head of the screw is to enter the guideway 82, the screw access opening must have circumferential extent of at least 180°. Where the shank 208 of the screw is to enter the guideway, the screw access opening may have a lesser circumferential extent.

In the forward section, the side wall 83 of the guide tube 75 engages the radially outermost periphery of the head 17 of the screw 16, to axially locate the screw head 17 coaxially within the guideway 82 in axial alignment with the drive shaft 34. In this regard, the side wall 83 preferably extends about the screw sufficiently to coaxially locate the screw head and thus preferably extend about the screw head at least 120°, more preferably, at least 150° and most preferably about 180°.

An exit opening 87, shown towards the left hand side of the guide tube 75 in FIGS. 4 and 5, is provided of a size to permit the spent plastic strip 13 from which the screws 16 have been driven to exit from the guideway 82. Forwardly of the exit an opening 87, the side wall 83 of the guide tube 75 is shown as extending greater than about 180° about the longitudinal axis 52 so as to continue to provide a side wall 83 which can assist and positively coaxially guiding the head 17 of a screw 16 being driven.

Figure 3:
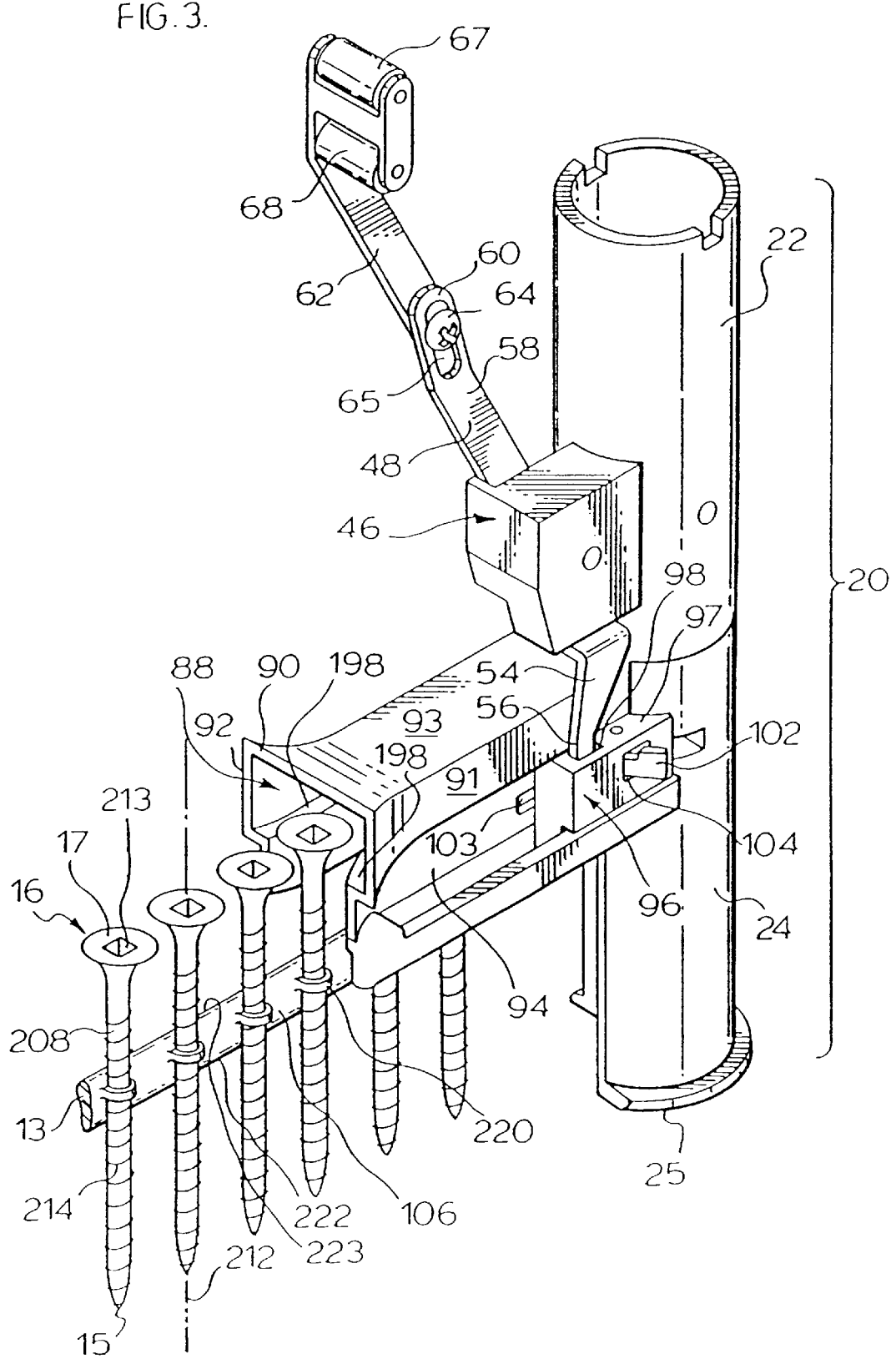
FIG. 3 is a pictorial view of the opposite side of the slide body to that shown in FIG. 2 but with a screwstrip positioned therein.

The screw feed channel element 76 is best seen in FIGS. 3 and 4 as providing a channelway 88 which extends radially relative the longitudinal axis 52 to intersect with the guideway 82 in the guide tube 75. In this regard, the channelway 88 opens to the guideway 82 as the screw access opening 86. The channelway 88 provides a channel of a cross-section similar to that of the screw access opening 86 from the screw access opening 86 to a remote entranceway opening 90. The channelway 88 is defined between two side walls 91 and 92 joined by a top wall 93. The major side wall 91 is shown as extending from the heads 17 of the screws 16 forwardly to at least partially, behind the plastic retaining strip 13. The lesser side wall 92 is shown as extending from the heads 17 of the screws 16 forwardly to above the plastic strip 13. Stopping the lesser side wall from extending down over the strip 13 assists in reducing friction between the strip 13 and the lesser side wall. The side walls 91 and 92 define the channelway 88 with a cross-section conforming closely to that of the screwstrip 14 and its strip 13 and screws 16 with an enlarged width where the heads of the screws are located and an enlarged width where the retaining strip 13 is provided about the screws. The side walls 91 and 92 also have an enlarged funneling section at the entranceway opening 90 which tapers inwardly to assist in guiding the screwstrip to enter the channelway.

As best seen in FIG. 3, the major side wall 91 is provided on its exterior back surface with a raceway 94 extending parallel the channelway 88 and in which a shuttle 96 is captured to be slidable towards and away from the guide tube 75 between an advanced position near the guide tube and a withdrawn position remote from the guide tube. The shuttle 96 has a rear surface 97 in which there is provided a rearwardly directed opening 98 adapted to receive the front end 56 of the forward arm 54 of lever 48 so as to couple the shuttle 96 to the lever 48 for movement therewith.

Shuttle 96 carries a pawl 99 to engage the screwstrip 14 and with movement of the shuttle 96 to successively advance the strip one screw at a time. As seen in FIG. 6, the shuttle 96 has a fixed post 100 on which the pawl 99 is journalled about an axis parallel the longitudinal axis 52 about which the driver shaft 34 rotates. The pawl 99 has a strip pusher arm 101 which extends through a slot 103 in the major side wall 91 to engage and advance the screwstrip. The pawl 99 has a manual release arm 102 away from pusher arm 101 and which extends out through a slot 104 in the shuttle 99. A torsional spring is disposed about post 100 between pawl 99 and shuttle 96 and urges the pusher arm 101 clockwise as seen in FIG. 6. The spring biases the pusher arm 101 into the screwstrip 14. The engagement of release arm 102 on the right hand end of slot 104 limits the pivoting of the pawl 99 clockwise to the position shown in FIG. 6.

The pusher arm 101 of the pawl 99 has a cam face 107. On the shuttle moving away from the guide tube 75 towards the withdrawn position, i.e., to the left in FIG. 6, the cam face 107 will engage the screws 16 and/or the strip 13 and permit the pusher arm 101 to pivot about post 100 against the bias of spring so that the pusher arm 101 may move with the shuttle to the left.

The pusher arm 101 has an engagement face 108 to engage the screws 16 and/or strip 13. On the shuttle moving towards the guide tube 75 towards the advanced position, i.e., to the right in FIG. 6, the engagement face 108 will engage the screws 16 and/or strip 13 and advance the screwstrip to the right as seen in FIG. 6 so as to position a screw 16 into the guideway 82 in a position to be driven and to hold the screwstrip 14 against movement towards the left. Preferably, as shown in FIG. 4, the engagement face 108 of the pusher arm engages the screw between its head 17 and the strip 13 as this has been found advantageous, particularly to avoid misfeeding with a nose portion 24 as shown with engagement of the screw heads in the channelway 88 and engagement of the spent strip 13' with the support surface 125.

The release arm 102 permits manual withdrawal of the screwstrip 14. A user may with his finger or thumb manually pivot the release arm 102 against the bias of spring so that the pusher arm 101 and its engagement face 108 is moved away from and clear of the screwstrip 14 whereby the screwstrip may manually be withdrawn as may be useful to clear jams or change screwstrips.

With the nose portion 24 coupled to the rear portion 22, the lever 48 couples to the shuttle 96 with the forward arm 54 of lever 48 received in the opening 98, of the shuttle 96. Sliding of the slide body 20 and the housing 18 in a cycle from an extended position to a retracted position and then back to an extended position results in reciprocal pivoting of the lever 48 about axis 51 which slides the shuttle 96 between the advanced and withdrawn position in its raceway 94 and hence results in the pawl 99 first retracting from engagement with a first screw to be driven to behind the next screw 165 and then advancing this next screw into a position to be driven.

The nose portion 24 is removable from the rear portion 22. The nose portion 24 and rear portion 22 may be coupled together by axially inserting the cylindrical portion 77 of the guide tube 75 into the bore 78 in the rear portion 22 with the key 80 aligned with the keyway slot 82 and with the front end 56 of the forward arm 54 of the lever 48 aligned with the opening 98 in the shuttle 96. Thus, the removable nose portion 24 may be coupled to the rear portion 22 merely by axially aligning the nose portion and the rear portion and moving the two elements together in a direction parallel the longitudinal axis 52.

With the nose portion 24 held on the rear portion 22 by a friction fit, the nose portion 24 can manually be removed by a user merely by the manual application of force. The nose portion 24 is removable from the rear portion 22 without disassembly or uncoupling of any of the remainder of the screwdriver assembly 10. Thus, the nose portion 24 is removable without uncoupling of the rear portion 22 relative any of the housing 18, spring 38, power driver 11, driver shaft 34 or the screw feed activation mechanism comprising amongst other things the lever 48 and cam follower 62 and without uncoupling of the cam follower 62 in camming channel 70 of the housing 18.

The nose portion 24 carries the guide tube 75 with its screw locating guideway 82, the screw feed channel element 76 with its channelway 88, and screw feed advance mechanism with the reciprocating shuttle 96 and pawl 99 to advance the screwstrip 14 via the channelway 88 into the guideway 82. Each of the guideway 82, channelway 88 and shuttle 96 are preferably customized for screwstrips and screws or other fasteners of a corresponding size. In this context, size includes shape, head diameter, shaft diameter, retaining strip configuration, length, spacing of screws along the retaining strip and the presence or absence of washes amongst other things. Different nose portions 24 are to be configured for different screwstrips and screws. The different nose portions 24 are each compatible with the same rear portion 22 and are readily exchangeable so as to permit the driver attachment to be readily adapted to drive different screwstrips and screws.

Many changes can be made to the physical arrangement of the nose portion 24 to accommodate different screws and fasteners. For example, the cross-sectional shape of the channelway 88 can be changed as can the diameter of the guideway 82. The length of the sidewalls 91 and 92 about the channelway 88 can be varied to accommodate different size screws which may require greater or lesser engagement.

To adjust for different spacing between screws in different screwstrips, the stroke of the shuttle 96 in reciprocating back and forth can be shortened or lengthened by varying the distance from the axis 51 of the lever 48 to where the shuttle 96 engages the forward arm 54 of the lever 48. For example, placing the same shuttle 96 in a raceway 94 spaced further from the axis 51 will increase the length of the stroke of the shuttle 96 for the same arc of pivoting of lever 48. Similarly, using the same shuttle 96 in the same raceway 94 but having the opening 98 in the shuttle 96 to engage the lever 48 farther from the axis 51 will also increase the length of the stroke of the shuttle 96 for the same arc of pivoting of lever 48.

In contrast with the removable nose portion 24 which is intended to be provided in many different replaceable configurations, the remainder of the driver attachment is preferably of a constant unchanged configuration. In this regard, the remainder of the driver attachment may be characterized by the housing 18, rear portion 22 of the slide body 20, drive shaft 34 and spring 38 together with a screw feed activation mechanism comprising the lever 48 cam follower 62 interacting between the rear portion 22 and the housing 18. This screw feed activation mechanism is activated by relative movement of the housing 18 and rear portion 22 and serves to engage and, move the screw feed advance mechanism comprising the shuttle 96 and pawl 99 carried on the nose portion 24.

The construction of the housing 18 and slide body 20 provide for a compact driver attachment.

The housing 18 has a part cylindrical portion formed by side wall 301.

The slide body 20 as best seen in FIG. 3 comprising the rear portion 22 and nose portion 24, has a part cylindrical portion of a uniform radius sized to be marginally smaller than the side wall 301 of the housing 18. The side wall 301 extends circumferentially about the part cylindrical portion of the slide body 20 to retain the slide body 20 therein.

The housing has a flange portion 302 which extends radially from one side of the part cylindrical portion and is adapted to house the radially extending flange 46 of the rear portion 22 and the screw feed activation mechanism comprising the camming channel 70 interacting with the lever 48 and cam follower 62. The flange portion 302 is open at its front end and side to permit the screw feed channel element 76 to slide into and out of the housing 18. Concentrically located about the drive shaft 34 is the spring 38, the part cylindrical portions of the slide body 20, and the part cylindrical portions of the housing 18.

The driver attachment is provided with an adjustable depth stop mechanism which can be used to adjust the fully retracted position, that is, the extent to which the slide body 20 may slide into the housing 18. The adjustable depth stop mechanism is best seen in FIGS. 2 and 3 as comprising an elongate rod 110 slidably received in an elongate open ended bore 111 provided in the side wall 42 of the housing 18 and extending parallel to longitudinal axis 52.

A depth setting cam member 114 is secured to the housing 18 for rotation about a pin 116 parallel the longitudinal axis 52. The cam member 114 has a cam surface 115 which varies in depth, parallel the longitudinal axis 52, circumferentially about the cam member 114. A portion of the cam surface 115 is always axially in line with the rod 110. A spring 113 biases the rod 110 rearwardly such that the rear end 117 of the rod engages the cam surface 115. The spring 112 is disposed between the housing and a pin 113 on the rod. By rotation of the cam member 114, the extent to which the rod 110 may slide rearwardly is adjusted.

The rod 110 has a front end 118 which extends forwardly from bore 111. for engagement with rearwardly directed annular stop surface 119 provided on the nose portion 24 of the slide body. The slide body 20 is prevented from further sliding into the housing 18 when the front end 118 of the rod 110 engages the stop surface 119. The extent the slide body 20 may slide into the housing 18 is determined by the length of the rod 110 and the depth of the cam member 114 axially in line with the rod. The cam member 114 is preferably provided with a ratchet-like arrangement to have the cam member 114 remain at any selected position biased against movement from the selected position and with circular indents or depressions in the cam surface 115 to assist in positive engagement by the rear end 117 of the rod. The cam member 114 is accessible by a user yet is provided to be out the way and not interfere with use of the driver attachment. The depth stop mechanism controls the extent to which screws are driven into a workpiece and thus controls the extent of countersinking. As the depth stop mechanism controls the distance from the workpiece the bit 122 must stop, a given countersink setting will be effective even if strips are switched to use screws of a different length. Adjustment is not required merely because different length screws are to be used.

The nose portion 24 may be customized for use in respect of different size screws by having the location of the stop surface 119 suitably provided axially on the nose portion 24 as may be advantageous for use of different size screws.

The driver shaft 34 is shown in FIGS. 4 and 5 as carrying a split washer 120 engaged in an annular groove near its rear end 121 to assist in retaining the rear end of the driver shaft in the socket 27 of the housing 18. The driver shaft 34 is provided with a removable bit 122 at its forward end which bit can readily be removed for replacement by another bit as for different size screws. Such bits include sockets and the like in any replacement bits will preferably be of an outside diameter complementary to the inside diameter of the guideway 82 in a corresponding replacement nose portion adapted for use with a corresponding sized screws. To accommodate bits of increased diameter over the bit shown in FIGS. 4 and 5, the guideway 82 of the guide tube 75 may be provided with an increased radius, at least commencing at the location where the bit may have an enlarged diameter and extending forwardly therefrom. The guideway 82 in the guide tubes 75 may thus have a step configuration with the sidewall 83 being of a reduced diameter where the driver shaft 34 enters the rear of the guide tube 75 and the side wall 83 may then increase to an enlarged diameter forwardly to accommodate an enlarged bit such as a socket.

The rear portion 22 is shown in FIGS. 4 and 5 as having a radially inwardly extending annular flange 19 which provides the end of the forwardly opening bore 78 as well as the end of a rearwardly opening bore 79 within which the spring 38 is received. The annular flange 19 has an opening therethrough of a diameter slightly larger than the diameter of the driver shaft 34 so as to assist in journalling the driver shaft therein. The opening through the annular flange 19 may however be increased so as to facilitate the use of driver shafts 34 having enlarged diameters as well as a driver shafts 34 having reduced diameters.

Insofar as the driver shaft 34 has a removable bit 122, it is preferred that as shown, when the driver attachment 12 is in the fully extended position and the nose portion 24 is removed, the bit 122 be readily accessible for removal and replacement. In this regard, it is preferred that the nose portion 124 have a guideway 82 of a minimum diameter throughout its length at least equal to the diameter of the bit 122 such that the nose portion 24 may be removed from the rear portion 22 without the need to remove the bit 122 as may otherwise be the case in the event the guideway 82 may have a stepped configuration.

Operation of the driver attachment is now explained with particular reference to FIGS. 4 and 5. As seen in FIG. 4, the screws 16 to be driven are collated to be held parallel and spaced from each other by the plastic retaining strip 13.

In operation, a screwstrip 14 containing a number of screws 16 collated in the plastic retaining strip 13 is inserted into the channelway 88 with the first screw to be driven received within the guideway 82. To drive the first screw into the workpiece 124, the power driver 11 is activated to rotate the driver shaft 34. The driver shaft 34. and its bit 122, while they are rotated, are reciprocally movable in the guideway 82 towards and away from the workpiece 124. In a driving stroke, manual pressure of the user pushes the housing 18 towards the workpiece 124. With initial manual pressure, the forward end 25 of the nose portion engages the workpiece 124 to compress spring 38 so as to move slide body 20 relative the housing 18 into the housing 18 from an extended position shown in FIG. 4 to a retracted position. On release of this manual pressure, in a return stroke, the compressed spring 38 moves the slide body 20 back to the extended position thereby moving the housing 18 and the driver shaft 34 away from the workpiece.

In a driving stroke, as the driver shaft 34 is axially moved towards the workpiece, the bit 122 engages the screw head 17 to rotate the first screw to be driven. As is known, the plastic strip 13 is formed to release the screw 16 as the screw 16 advances forwardly rotated by the driver shaft 34. Preferably, the screw tip will engage in a workpiece before the head of the screw engages the strip such that engagement of the screw in the workpiece will assist in drawing the screw head through the strip to break the frangible straps, however, this is not necessary and a screw may merely, by pressure from the drive shaft, be released before the screw engages the workpiece. Preferably, on release of the screw 16, the plastic strip 13 deflects away from the screw 16 outwardly so as to not interfere with the screw 16 in its movement into the workplace. After the screw 16 is driven into the workpiece 124, the driver shaft 34 axially moves away from the workpiece under the force of the spring 38 and a successive screw 16 is moved via the screw feed advance mechanism from the channelway 88 through the access opening 86 into the guideway 82 and into the axial alignment in the guideway with the driver shaft 34.

The screw 16 to be driven is held in position in axial alignment with the driver shaft 34 with its screw head 17 abutting the side wall 83 in the guideway 82. As a screw 16 to be driven is moved into the cylindrical guideway 82, a leading portion of the strip 13' from which screws have previously been driven extends outwardly from the guideway 83 through the exit opening 87 permitting substantially unhindered advance of the screwstrip 14.

To assist in location of a screw to be driven within the guide tube 75, in the preferred embodiment the exit opening 87 is provided with a rearwardly facing locating surfaced 125 adapted to engage and support a forward surface 222 of the strip 13. Thus, on the bit 122 engaging the head of the screw and urging the screw forwardly, the screw may be axially located within the guide tube 75 by reason not only of the head of the screw engaging the side wall 83 of the guideway but also with the forward surface 222 of the strip 13 engaging the locating surface 125 of the exit opening 87. In this regard, it is advantageous that the forward surface 222 of the retaining strip 13 be accurately formed having regard to the relative location of the screws 16 and particularly the location of the their heads 17. The forward surface 222 of the strip 13 may be complementary formed to the locating surface 125 and if desired indexing notches or the like may be provided in the forward surface 222 of the strip 13 to engage with complementary notches or indents on the locating surface 125 of the entranceway to assist in indexing location of the strip 13 relative the locating surface and enhance the location thereby of the screw 16 within the guide tube 75.

Figure 8:
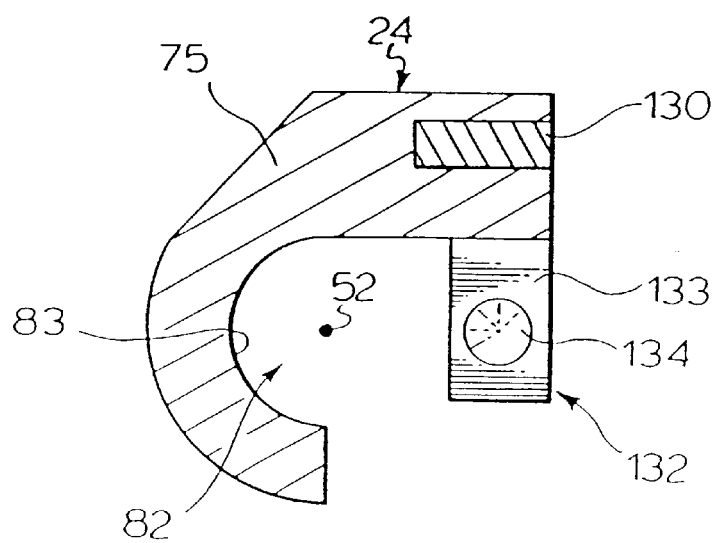
FIG. 8 is a cross-sectional view through section VIII–VIII' in FIG. 7.

Reference is now made to FIGS. 7 and 8 which show an alternate embodiment of a removable nose portion which provides another mechanism to locate each successively advanced screw axially aligned with the driver shaft 34. The alternate embodiment includes a retractable foot plate similar to that taught in U.S. Pat. No. 4,146,071 to Mueller et al. The foot plate 128 is provided to engage and fix the position of a screw adjacent the screw which is to be driven. As seen, the modified nose portion is provided with a slot 129 which extends rearwardly parallel longitudinal axis 52. The foot plate 128 has a general L-shape with a slide portion 130 axially slidably received within the slot 129 to slide therein in a direction parallel longitudinal axis 52. A spring 131 biases the foot plate 128 out of the slot 129 and while not shown, a suitable stop mechanism is provided to limit the foot plate 128 to extend from the slot 129 to a maximum distance.

The foot plate 128 has a foot portion 132 which extends normal to the longitudinal axis 52 and provides in a rearwardly facing surface 133 a conical recess 134. This recess 134 is located to be axially in line with the tip 15 of a "next" screw 16 in the screwstrip 14 adjacent the screw 16 to be driven.

In use of a driver attachment with a modified nose portion 24 as shown in FIGS. 7 and 8, the foot plate 128 is the first element of the attachment to engage the workpiece. On engaging the workpiece, the foot plate 128 slides rearwardly into the slit 129 and thus retracts into the nose portion 24. The foot portion 132 in moving rearwardly engages the tip 15 of the "next" screw 16 next to the screw 16 to be driven and accurately locates the tip 15 within the conical recess 134. The foot portion 132 applies a force to such next screw pushing the screw rearwardly so that the head 17 of the screw bears on the flat top wall 93 in the channelway 88. By reason of such next screw being firmly clamped between the foot plate 128 and the top wall 93 of the channelway, the screwstrip 14 is effectively locked into position and thereby assists in positioning the screw 16 which is to be driven axially aligned with the longitudinal axis 52. It is to be appreciated that different removable nose portions 24 may be provided with different foot plates 128 having appropriate relative location of the foot portion 132 and its conical recess having regard to the length of the screw and to the spacing between the screws along the retaining strip 13. In known manner, the foot plate 128 may be provided to be adjustably located on the nose portion 24.

FIGS. 7 and 8 show an embodiment of the nose portion 24 utilizing in combination three different mechanisms whereby a screw to be driven advanced through the screw guide channel mechanism is to be located axially in alignment with the driver shaft 34. The three mechanisms are the engagement of the screw head with the side wall 83, the engagement of the spent strip 13' on the locating surface 125 of the exit opening 87, and the clamping of the next to be driven screw by the foot plate 128. Only one or more of these mechanisms need be provided particularly insofar as the channelway 88 may be precisely configured for specific sized screws 16 and screwstrips 14 and provide by itself generally increased support and location of the screwstrip 14 without restricting free sliding of the screwstrip and its screws therethrough. With an improved correspondence in sizing between the screwstrip 14 and the channelway 88 and the radial extent of the channelway effectively locating the screwstrip and its screws in a plane intersecting the longitudinal axis 52, a simple guide mechanism may be provided focusing principally on constraining the screwstrip 14 or its screw against movement radially relative the channelway 88.

In the embodiment of the nose portion 24 shown in FIGS. 1 to 6, on the bit 122 engaging the head 17 of the screw 16 and urging it forwardly in the guideway 82, the strip 13 is preferably held against movement forwardly fustly by the forward surface 222 of the strip engaging locating surface 125 and, secondly, by the under surfaces of the heads 17 of screws in the channelway 88 engaging on the rearwardly directed shoulders provided on each of the side walls 91 and 92 where the enlarged width cross-section of the channelway 88 accommodating the head of the screws reduces in width as seen in FIG. 3. Together with the location of the head 17 of a screw 16 coaxially in the guideway, the screw 16 to be driven is located axially aligned with the driver shaft without any moving parts other than the advance shuttle 96.

The driver attachment 12 disclosed may be provided for different applications. In a preferred application, the driver may be used for high volume heavy load demands as, for example, as in building houses to apply sub-flooring and drywall. For such a configuration, it is preferred that with the power driver 11 comprising a typical screw gun which inherently incorporates a friction clutch and thus to be extent that a screw is fully driven into a workpiece, the clutch will, on the forces require to drive the screw becoming excessive, slip such that the bit will not be forced to rotate an engagement with the screw head and thus increase the life of the bit.

Figure 29:
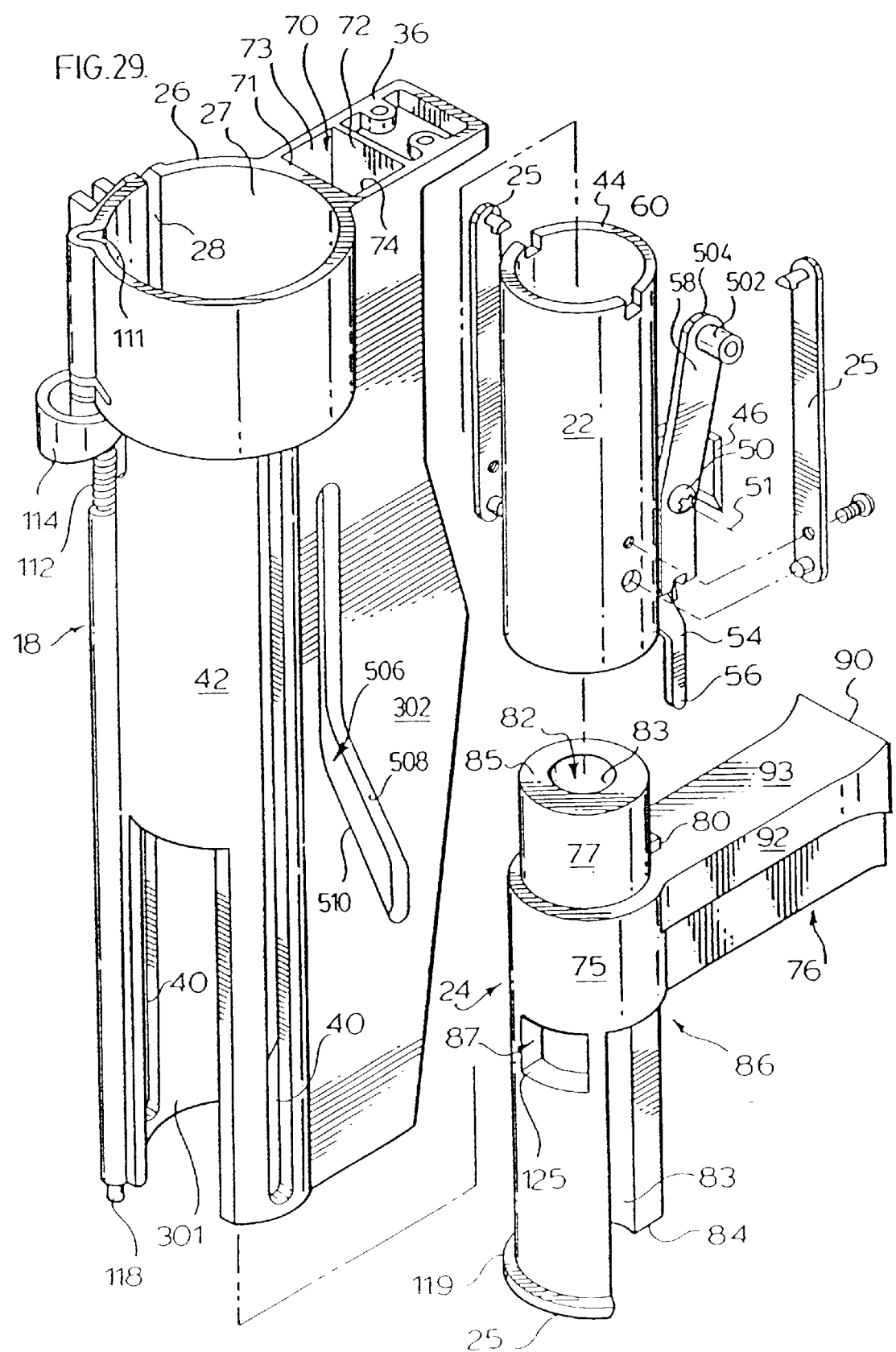
FIG. 29 is an exploded pictorial view of a housing and slide body similar to FIG. 2, however, showing another aspect of the present invention having a modified camming arrangement with a pin and cam slot to move the advance lever in relation to relative sliding of the slide body and housing.
Figure 30:
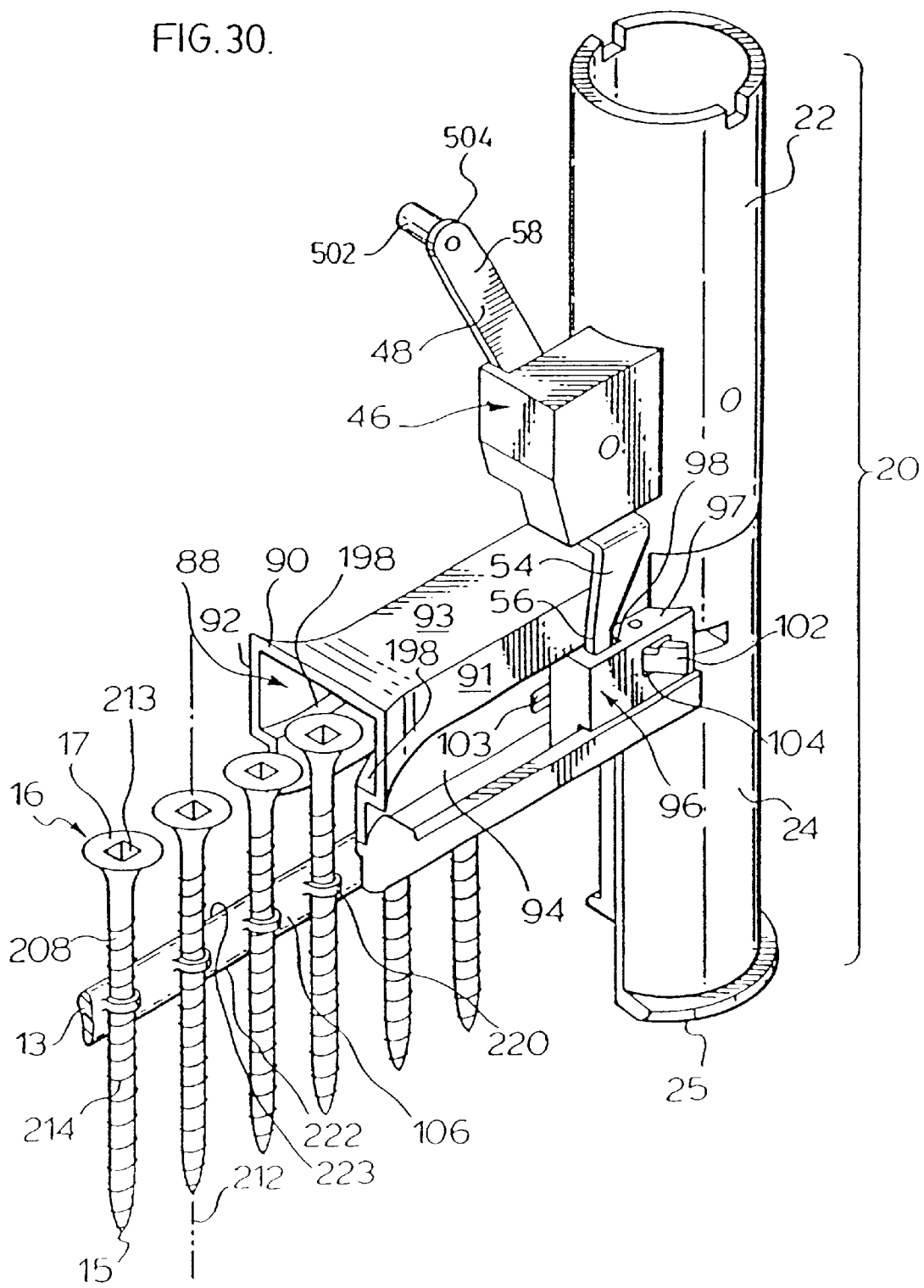
FIG. 30 is a pictorial view of the opposite side of the slide body to that shown in FIG. 29 but with a screwtip positioned therein.

Reference is made to FIGS. 29 and 30 which show a driver apparatus identical to that of FIGS. 1 to 6 but for the following modifications. Firstly, the rear arm 58 of the lever 48 has been modified to provide a cam pin 502 near its rear end 504, thus eliminating the slot 65 and the cam follower 62 with its cam rollers 67 and 68. Secondly, a cam slot 506 has been provided in the side wall 302 of the housing 18.

Figure 31:
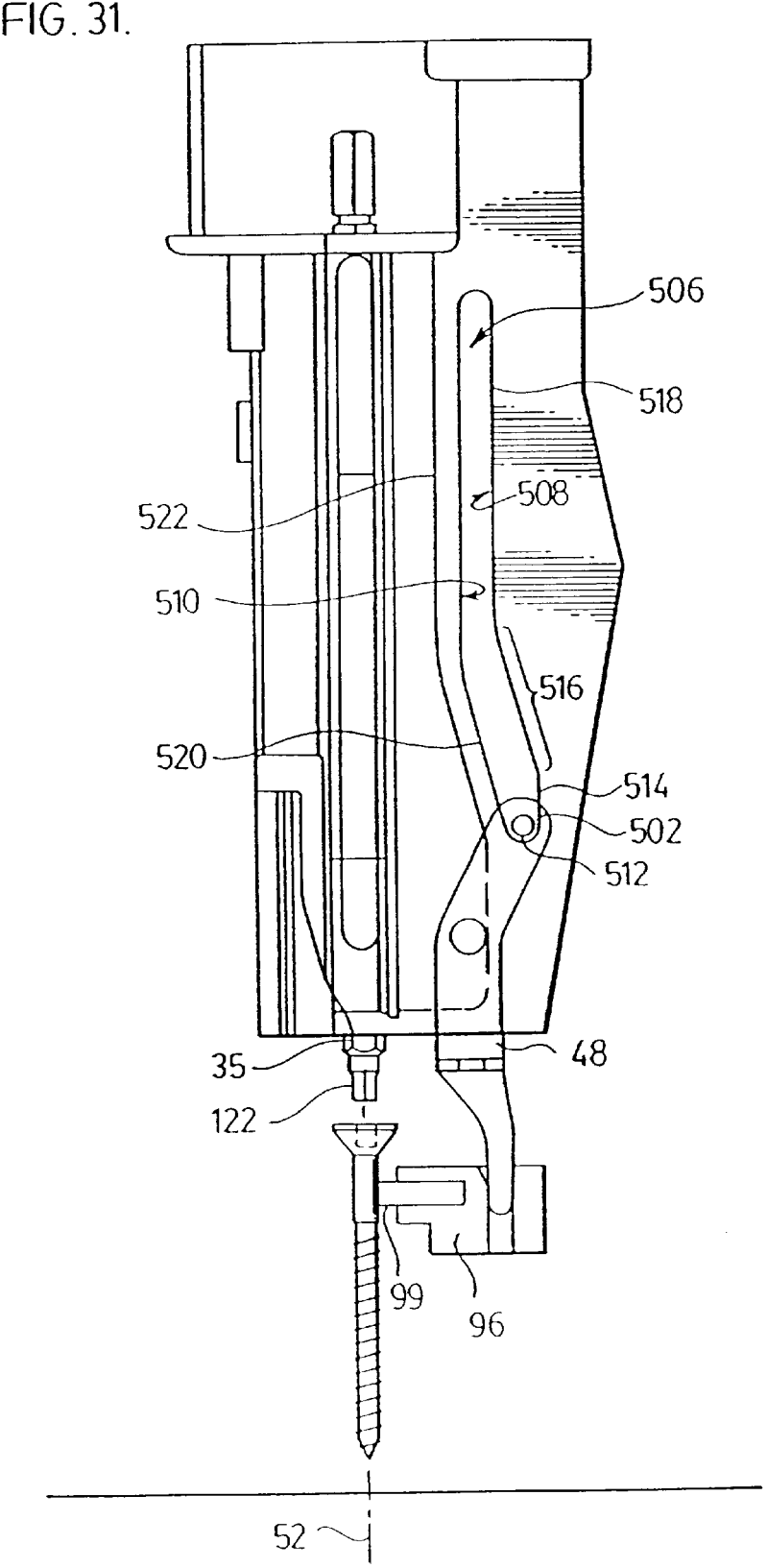

The cam slot 506 has a first camming surface 508 and a second camming surface 510 spaced therefrom and presenting different profiles as best seen in side view in FIG. 31. The cam pin 502 is received in cam slot 506 between the first and second camming surfaces 508 and 510 for engagement of each under different conditions of operation. Spring 69 about bolt 50, as shown in FIG. 4, biases the lever 48 in a clockwise direction as seen in FIG. 30 and thus biases the lever to pivot in a direction which moves the shuttle 96 towards the axis 52 of the guide tube and biases the cam pin 502 towards the first camming surface 508.

In operation of the driver attachment, the slide body 20 moves relative the housing 18 in a cycle of operation in which the slide body moves in a retracting stroke from the extended position to the retracted position and then moves in an extending stroke from the retracted position to the extended position. Whether in any position in a cycle the cam pin 502 will engage either the first camming surface 508 or the second camming surface 510 will depend on a number of factors. Most significant of these factors involve the resistance to movement of the shuttle 96 in either direction as compared to the strength of the spring 69 tending to move the shuttle 96 towards axis 52. Under conditions in which the bias of the spring 69 is dominant over resistance to movement of the shuttle 96, then the bias of the spring will place the cam pin 502 into engagement with the first camming surface 508 with relative motion of the lever 48 and therefore the shuttle 96 relative the position of the slide body 20 in the housing 18 to be dictated by the profile of the first camming surface 508. Under conditions where the resistance to movement of the shuttle is greater than the force of the spring 96, then the cam pin 502 will either engage the first camming surface 508 or the second camming surface 510 depending on the direction of such resistance and whether the slide body is in the retracting stroke or the extending stroke. For example, in an extension stroke when the shuttle 96 is engaging and advancing the next screw to be driven and the resistance offered to advance by the screwstrip may be greater than the force of the spring 69, then the cam pin 502 will engage on the second camming surface 510.

In the preferred embodiment shown, as best seen in FIG. 31, the first camming surface 508 has a first portion 514, a second portion 516 and a third portion 518. The first portion 514 and the second portion 518 are substantially parallel the driver shaft axis 52. Second portion 516 extends at an angle rearwardly and towards axis 52.

The second camming surface 510 has a first portion 520 which extends angling forwardly and away from axis 52 and a second portion 522 which is substantially parallel the axis 52.

The third portion 518 of the first camming surface 508 and the second portion 522 of the second camming surface 510 are parallel and disposed a distance apart only marginally greater than the diameter of cam pin 502 so as to locate the cam pin 506 therein in substantially the same position whether the cam pin 502 rides on first camming surface 508 or second camming surface 510.

The cam slot 506 has a front end 512 where the first portions 514 of the first camming surface 508 merges with the first portion 520 of the second camming surface 510. In the front end 512, the width of the cam slot 506 is also only marginally greater than the diameter of the cam pin 502 so as to locate the cam pin 506 therein in substantially the same position whether the cam pin 502 rides on the first camming surface 508 or the second camming surface 510.

The first portion 520 of the second camming surface 510 is spaced from the first camming surface 508 and, in particular, its first portion 514 and second portion, 516 by a distance substantially greater than the diameter of cam pin 502.

Figure 33:
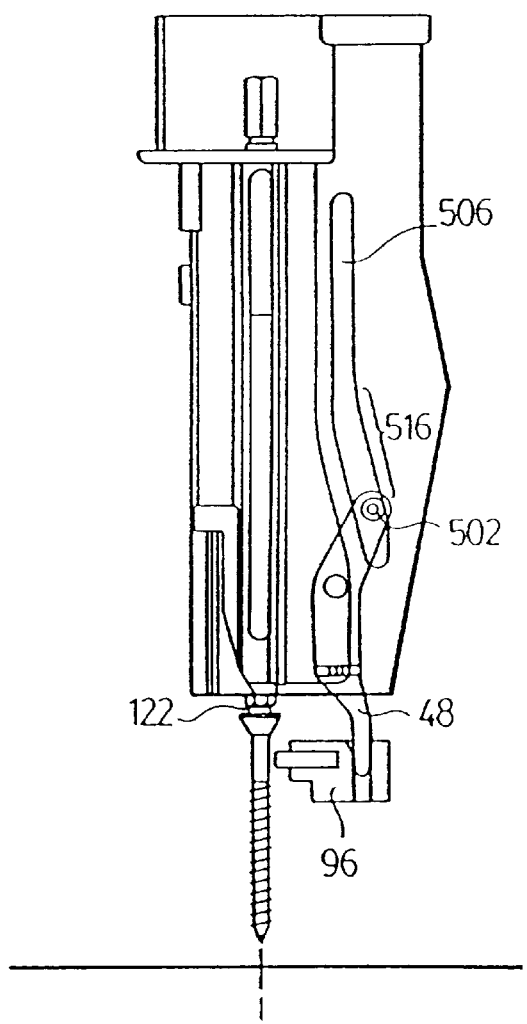
Figure 34:
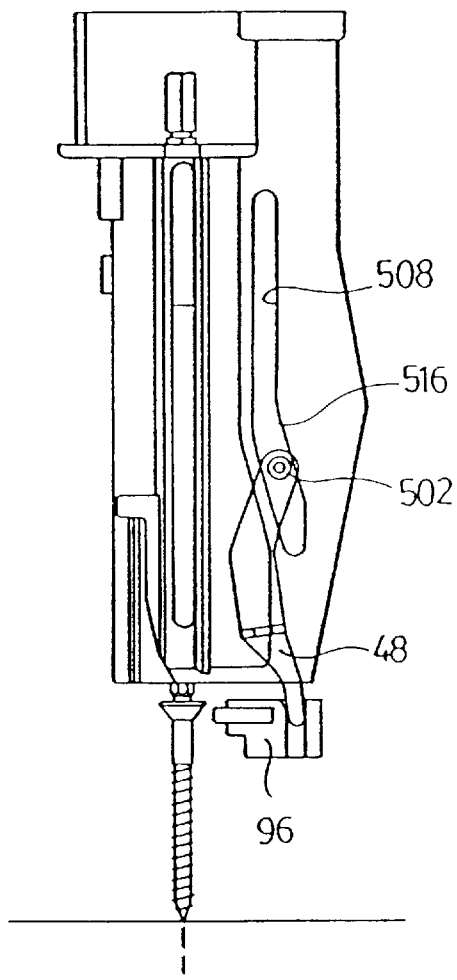
Figure 35:
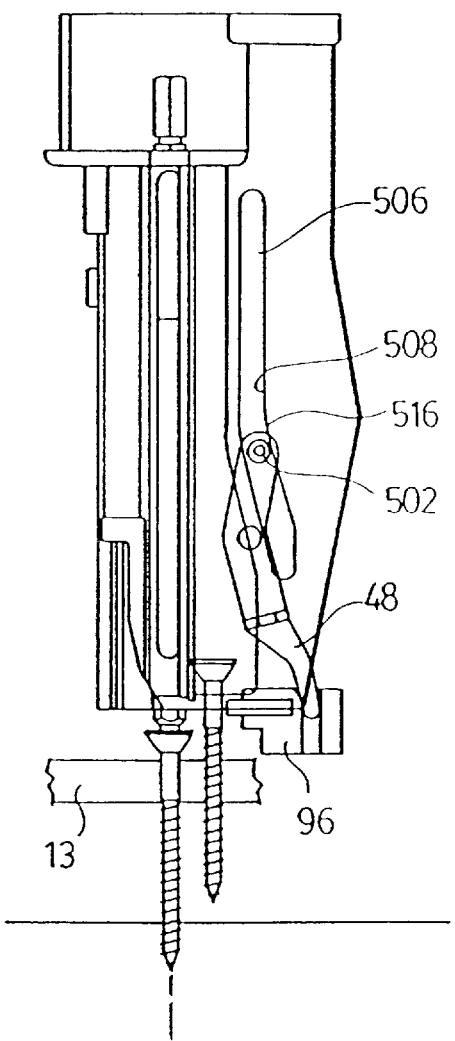

Reference is made to FIGS. 31 to 41 which show schematic side views of the driver attachment of FIGS. 29 and 30 in successive positions in a cycle to drive a screw. In FIGS. 31 to 41, for clarity, none of the slide body 20, nose portion 24 and the strip 13 are shown such that the relative positions of the screw can be seen. In most of FIGS. 31 to 34 and 37 to 41, neither the next screw to be driven nor the strip 13 are shown. Only in FIGS. 35 and 36 are the next screw to be driven and the strip 13 shown.

FIG. 31 shows a view at the start of a cycle with the slide body fully extended by spring 38. The cam pin 502 is received in the front end 512 of cam slot 506 shown in FIG. 4. The shuttle 96 and its pawl 99 hold the screw to be driven aligned with the driver shaft 34 and its bit 122 by urging the head of the screw into the side wall 83 of the guide tube 75 as shown in FIG. 4. The bit 122 is rearward of the screw.

Figure 32:
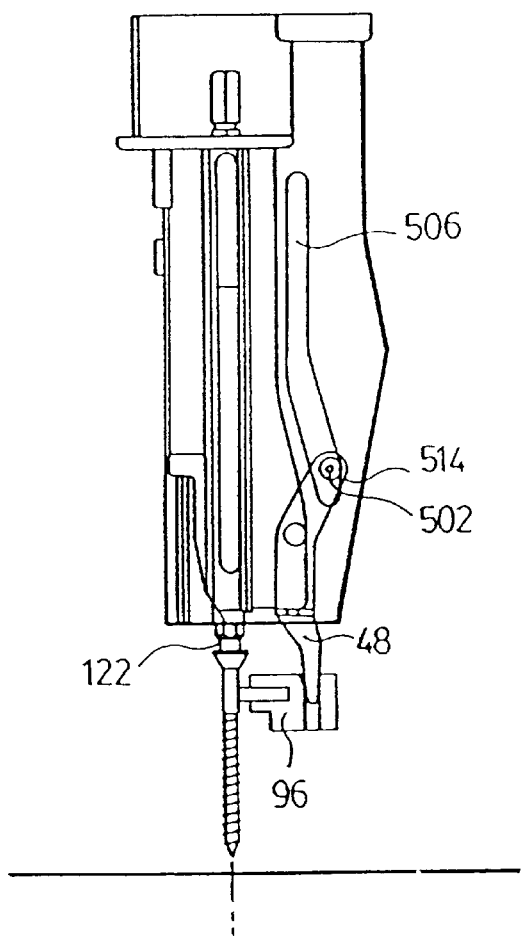

FIG. 32 shows the slide body retracted sufficiently that the bit 122 has just become engaged in the head of the screw, although the screw has not yet been advanced. The cam pin 502 has moved rearwardly in cam slot 506 sliding up the first portion 514 of the first camming surface 508 of cam slot 506. As the first camming surface 508 extends from the front end 512 substantially rearwardly parallel the driver shaft axis 52 as the first portion 514, the lever 48 does not move from a position holding the screw as in FIG. 31.

FIG. 33 shows the slide body further retracted to a point where the bit 122 is fully engaged in the head of the screw and the clutch on the power driver has been engaged and the screw has commenced to rotate. The cam pin 502 has become engaged on a second portion 516 of the first camming surface which angles rearwardly toward the driver shaft and, therefore, with further retraction of the slide body will pivot lever 48 to withdrawal shuttle 96.

FIG. 34 shows the slide body further retracted to a point where the shuttle 96 has been withdrawn a sufficient extent that the pawl 99 has been moved out of the axial path of the head of the screw, the bit 122 and the driver shaft, by reason of the cam pin 506 riding on the second portion 516 of the first camming surface 508.

FIG. 35 shows the slide body further retracted to a point where the shuttle 96 has been withdrawn a sufficient extent that its pawl 99 has become engaged behind the next screw to be driven as carried in strip 13. The screw which is being driven by the bit 122 has been advanced from its position of FIG. 34 into the workpiece, however, the screw being driven remains engaged on the strip 13 and has not yet been severed from the strip 13. The cam pin 506 continues to ride on the first camming surface 508.

FIG. 36 shows the slide body further retracted to a position to drive the screw being driven into a workpiece. FIG. 36 shows that the screw being driven has been severed from the strip 13 and the pawl 99 remains on the withdrawal side of the next screw to be driven. The cam pin 506 has been moved rearwardly from second angled portion 516 to the third portion 518 which extends rearwardly parallel the driver shaft axis 52 and, thus, maintains the shuttle 96 in the same relative position withdrawn behind the next screw to be driven.

FIG. 37 shows the slide body as fully retracted with the screw driven fully rearward into a workpiece at the end of the retraction stroke. From the position of FIG. 36 to the position of FIG. 37, the cam pin 502 has moved rearwardly along, the first camming surface 508 in the straight third portion 518.

The retraction stroke has been illustrated in a cycle of operation by retraction of the slide body 20 into the housing 18 successively through the position of FIGS. 31 to 37. In each of FIGS. 32 to 37, the cam pin 502 has been shown as engaged on first camming surface 508 since the bias of spring 69 about lever 48 has been greater than any resistance to movement of the shuttle 96 towards the advance position.

The extension stroke in a cycle of operation is illustrated by extension of the slide body successively through the positions of FIGS. 37 to 41 and then back to the position of FIG. 31. In the extension stroke, the driver shaft 34 and its bit 122 is withdrawn rearwardly to locate rearward of a screw to be driven at the same time the screw to be driven is advanced.

Figure 38:
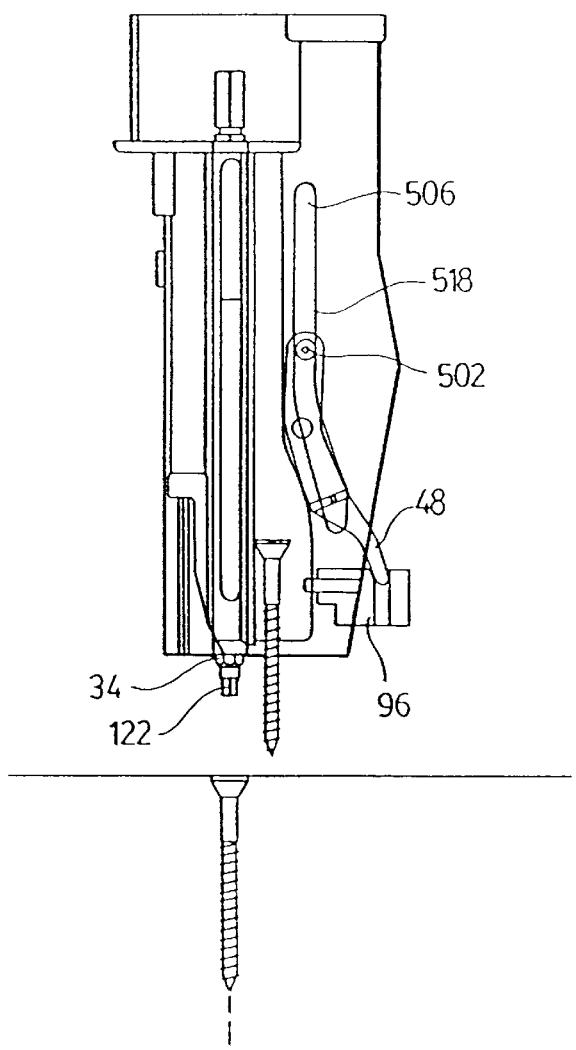
Figure 39:
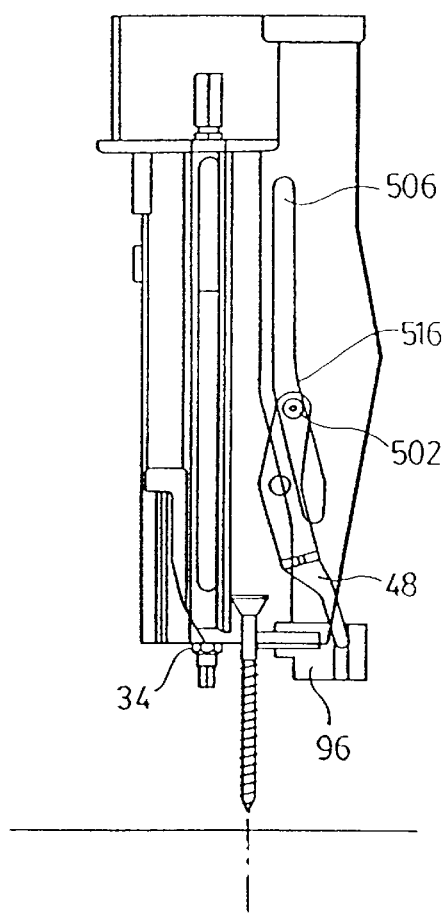

In moving from FIG. 37 to FIG. 38, the cam pin 506 moves along the third portion 518 of the first camming surface 508 and the shuttle 96 does not advance. Once the cam pin 506 starts to engage the second portion 516 of the first camming surface 508, the lever 48 commences to move the shuttle 96 towards the advanced position with the pawl 99 first engaging the screw in the position shown in FIG. 39. In FIG. 39, the head of the screw is shown spaced to one side radially from the driver shaft 34.

With subsequent advance from the position of FIG. 39 to the position of FIG. 40, the head of the screw is advanced into contact with the side of the driver shaft 34 as seen in FIG. 40. With the head of the screw engaging the driver shaft 34, the resistance forces to advance of the shuttle 96 becomes greater than the bias of the spring 69 about the lever. The location of the head of the screw engaging the driver shaft 34 dictates the location of the shuttle 96, lever 48 and cam pin 502. The cam pin 502 is moved off the first camming surface 508 and may float between the first and second camming surfaces. Where there is interference between the withdrawing driver shaft and the next screw, the distance between the first and second camming surfaces 506 and 508 is selected to be at least sufficient that the lever 48 may pivot against the bias of spring 69 a sufficient extent that the shuttle 96 can assume a position withdrawn the greater of the diameters of the driver shaft 34 and the bit 122.

The head of the screw is urged into contact with the side of the driver shaft 34 and bit 122 from about the position of FIG. 40 until about the position of FIG. 41 when the axial end of the bit 122 moves rearwardly of the head of the screw, at which time the screw is ready to be advanced into axial alignment with the driver shaft as shown in the fully extended position of FIG. 31.

To advance the screw, the resistance forces to advance met by the shuttle 96 may be greater than the bias of the spring 69 of the lever. In such a condition, as shown in FIG. 41, the cam pin 502 engages the second camming surface 510 which can positively urge the lever 48 to advance the shuttle 96 and screw in advancing to the fully extended position of FIG. 31 from the position in FIG. 41.

Having the interference between the screw being advanced and the driver shaft 34 and bit 122 has been found to not be disadvantageous where the forces exerted by spring 69 about the lever 48 are not excessive. Such interference could be avoided as by using lost motion devices such as the slot 65 described with the first embodiment of FIGS. 1 to 6. The embodiment of FIGS. 29 to 41 has been found to provide advantageous operation with a more simplified construction.

The embodiment of FIGS. 29 and 30 is particularly advantageous in that in the final advance of the screwstrip in the end of the extension cycle, the second camming surface 510 can provide positive advancing forces greater than the force of spring 69 about lever 48. This permits this embodiment to utilize a lesser strength spring 69 than other systems. Using a lesser strength spring reduces the frictional forces between cam pin 502 and the camming surfaces.

Figure 27:
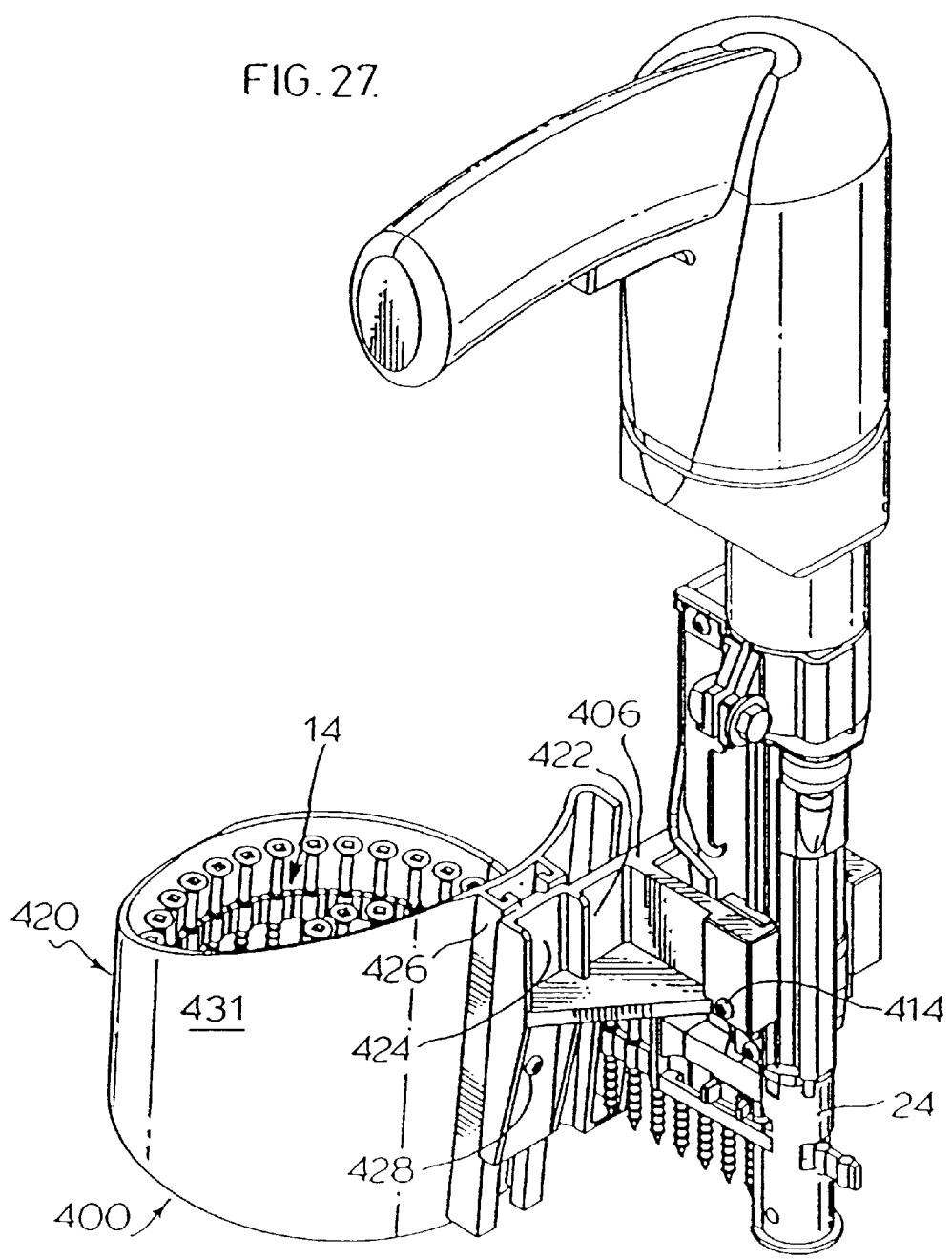
FIGS. 27 and 28 are pictorial views from opposite angles of a driver assembly utilizing the driver attachment of FIG. 25.
Figure 28:
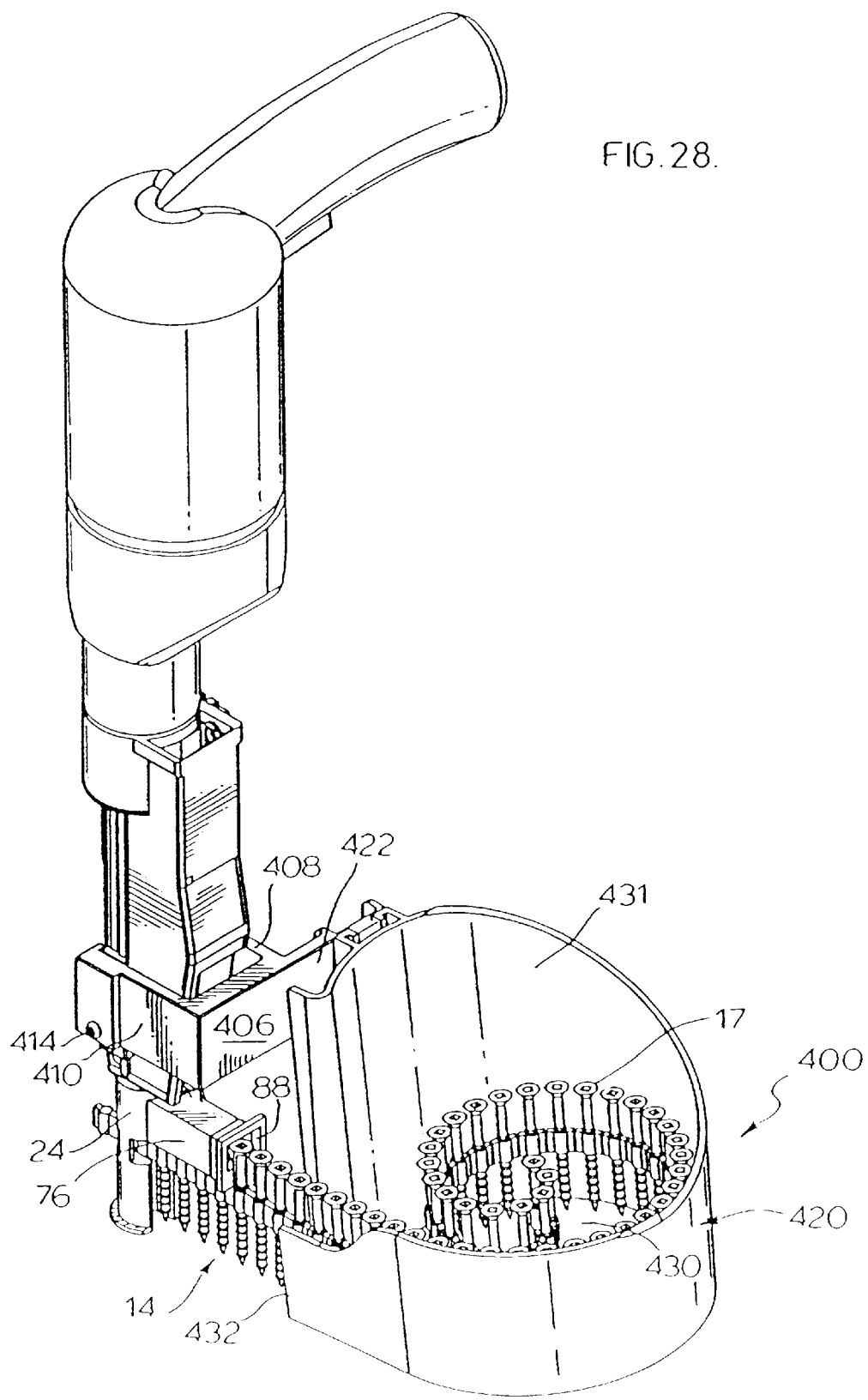

The embodiment of FIGS. 29 and 30 is particularly advantageous for use with a canister 400 containing a coil of a collated screwstrip as illustrated in FIGS. 27 and 28 to drive screws vertically downwardly. With the canister 400 mounted to the slide body 20 and with the screws to be driven vertically downwardly, the weight of the canister 400 and its screws tend to complement the spring 38 and draw the slide body 20 vertically downwardly to the fully extended position. The increased weight of the canister thus ensures that the cam pin 502 locates fully in the front end 512 of the cam slot 506 and ensures that the screw to be driven is fully advanced overcoming any forces resisting advance.

With the preferred embodiments of this invention using but one pawl lever, a preferred configuration of the relative timing of pivoting of the lever 48 compared to the relative location of the slide body in the housing 18 is one in which the following aspects (a) and (b) are met, namely:

(a) firstly, the pawl 99 engages the screw to be driven to maintain the screw in axial alignment with the bit 122 until the bit 122 has engaged in the recess 213 in the screw head for rotational coupling therewith; and (b) secondly, the pawl 99 sufficiently withdraws itself such that, before the screw being driven detaches itself from the strip 13, the pawl 99 is located engaged on the withdrawal side of the next, screw to be advanced.

Aspect (b) is advantageous to ensure that the screwstrip may not be inadvertently withdrawn or dislodged before the pawl 99 becomes engaged behind the next screw to be advanced. While the screw being driven is attached to screwstrip, the screwstrip is held by the bit against removal by rearward movement. If, however, the screwstrip becomes detached from the screwstrip before the pawl 99 is behind the next screw to be driven, then at this time, the screwstrip can move in a direction opposite the direction of advance, for example, either to become removed from the feed channel element 76 or to be displaced an extent that the pawl cannot engage the next screw to be driven.

To have aspects (a) and (b) permits preferred advantageous operation with merely a single pawl member utilized to advance each screw, to hold it in place until the bit engages in the screw and then while the screw is held by the bit, to withdrawal to engage behind the next screw to be driven such that the pawl is engaged behind the next screw when the screw being driven becomes disengaged from the strip. For example, where aspect (b) is not satisfied, the difficulty can arise, for example, that in the movement of the pawl 99 towards the withdrawal position, the pawl 99 may engage the strip and itself move the strip in a direction opposite the advance direction. Having a relatively weak spring which urges the pusher arm 101 of the pawl into the screwstrip can reduce the likelihood that the pawl 99 may move the strip in a direction opposite the advance direction. Movement of the strip in a direction opposite the advance direction can be avoided by the screwstrip and screws being engaged in the screwdriver in frictional engagement to resist withdrawal. To some measure, such frictional engagement arises by reason of the spent screwstrip extending out of the exit opening 87 and the screw heads, shanks and/or strip frictionally engaging the screw feed channel element 76 and/or the guide tube 24. However, any such friction is contrary to a preferred configuration in which the frictional forces to be overcome by advance of the screwstrip are minimized. Therefore, it is a preferred system with least resistance to advance of the screwstrip and with a single pawl that it is most preferred that aspects (a) and (b) being incorporated in a tool.

It is also advantageous that in addition to aspects (a) and (b), that after aspect (a) and before aspect (b), an aspect (c) is met whereby the pawl 99 moves toward the withdrawal position sufficiently that the pawl 99 is moved out of the path of the head of the screw and the driver shaft 34 and its bit 122 as they advance a screw. This aspect (c) is advantageous so as to avoid the pawl 99 interfering with the easy advance of the screw head, bit and mandrel.

Aspects (a), (b) and (c) can be achieved, for example, by the camming surfaces moving the lever 48 to hold the shuttle 96 and therefore the pawl 99 at a position either holding or urging the head of the screw into engagement within the guide tube in axial alignment with the bit until the bit engages in the recess in the head, rotatably coupling the bit and the screw and preferably driving the screw at least some distance. However, before the head of the screw moves forwardly sufficiently to engage the pawl 99, if the pawl 99 were not moved from the position of aspect (a), the camming surfaces causes the lever 48 to pivot moving the shuttle 96 towards the withdrawn position out of the way of the axial path of the head of the screw's bit and mandrel. The pawl 99 merely needs to be moved towards the withdrawn position such that it engages behind the next screw before the screw being driven disengages from the strip as by the head of the screw rupturing the strip. However, it is permissible if the pawl 99 moves relatively quickly compared to the advance of the screw being driven to the position behind the next screw.

As another fourth aspect to relative timing is the aspect that in the extension stroke a screw being advanced not interfere with withdrawal of the driver shaft and its bit. While embodiments can be configured so all interference is avoided, this is not necessary. Advantageously, when aspects (a), (b) and (c) are achieved as by minimizing the relative time that the pawl 99 engages the first screw in satisfying aspect (a), and prompt withdrawal to satisfy aspect (c), this can minimize the relative extent to which interference can arise between the next screw to be driven and the bit or mandrel on the extension stroke.

Figure 9:
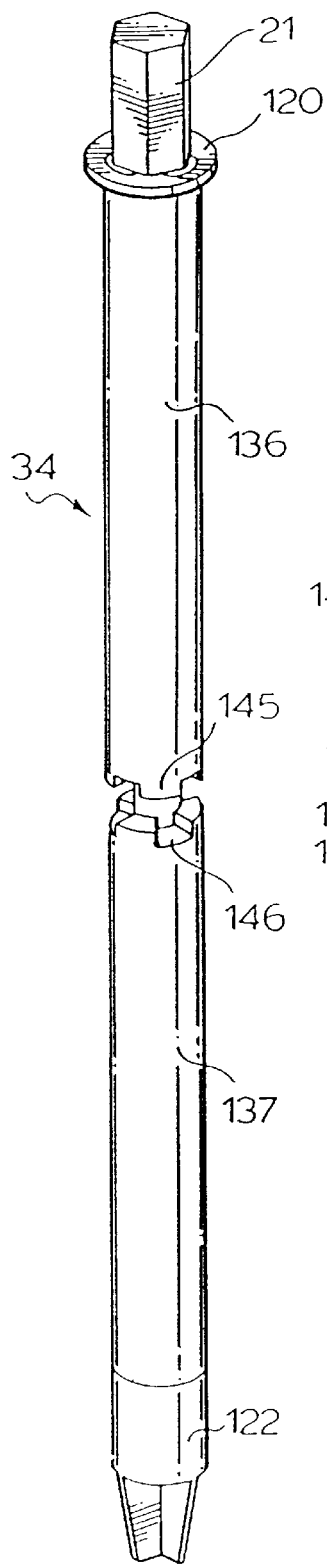
FIG. 9 is a pictorial view of an optional clutch drive shaft in accordance with another aspect of the invention.
Figure 10:
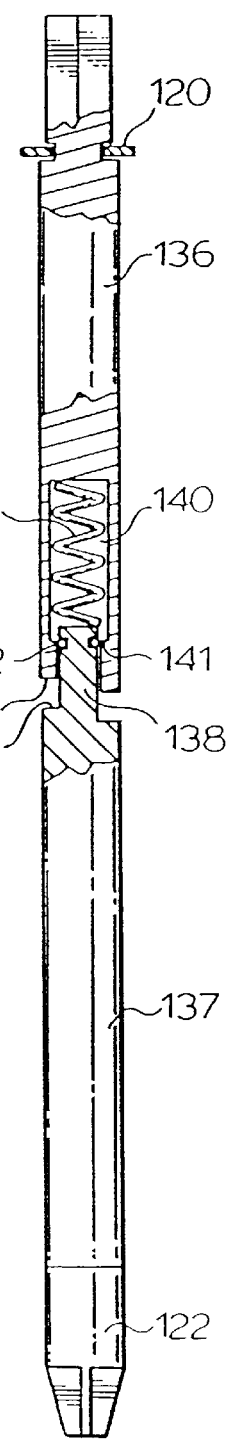
FIG. 10 is a cross-sectional view of the drive shaft of FIG. 9 passing through the longitudinal axis in FIG. 9 and with the drive shaft in a disengaged position.
Figure 11:
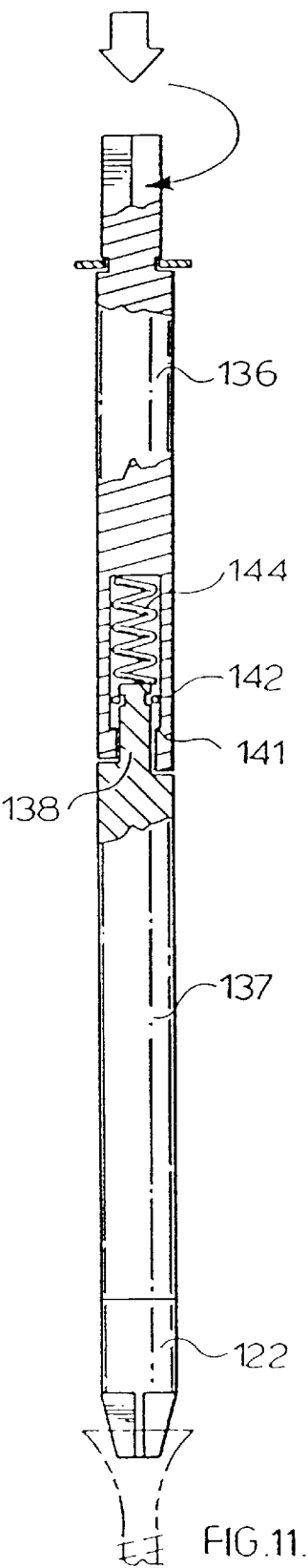
FIG. 11 is a view identical to that of FIG. 10 but with the drive shaft in an engaged position.

The driver attachment in accordance with the present invention is adaptable for use with conventional power drills which are similar to screw guns yet do not incorporate a clutch mechanism. The driver attachment may be suitably used with a drill without a clutch preferably with the user manipulating the drill and driver attachment in use to reduce the likelihood of bit wear by the bit rotating relative to the screw head in a jamming situation. FIGS. 9, 10 and 11 show an optional form of a driver shaft 34 which provides a simple clutch arrangement as for use with a power drill which does not have a clutch.

Referring to FIGS. 9 to 11, the modified driver shaft 34 has a rear body 136 whose rear end is to be secured in the chuck 32 of a power drill in a normal manner. The driver shaft 34 has a front slide 137 which is axially slidable relative the rear body 136.

The front slide 137 includes a cylindrical rod 138 of reduced diameter which extends forwardly into a forwardly opening cylindrical bore 140 in the rear body The bore 140 in the rear body has at its forward end a radially inwardly extending shoulder 141. A split ring 142 carried on the rod 138 is received in an annular groove 143 about the rod 138. The split ring 142 is provided such that the split ring may be compressed into the groove 143 to permit the rod 138 to be inserted into the bore 140. Once inside the bore 140, the split ring 142 expands outwardly and will engage with the shoulder 141 so as to retain the rod 138 in the bore 140 against removal. A spring 144 is provided within the bore 140 and biases the front slide 137 forwardly away from the rear body 136.

The rear body 136 and front slide 137 have opposed clutch surfaces 147 and 148 which when urged together cause the rear body and front slide to rotate in unison. However, when the clutch surfaces are disengaged, the rear body 136 may rotate without rotation of the front slide 137. As shown in the drawings, the clutch surfaces comprise complementary teeth and slots on the opposed axially directed end surfaces of the rear body 136 and the front slide 137. For example, a tooth 145 on rear body 136 is adapted to be received within a slot 146 on front slide 137. While axially directed clutch surfaces with teeth may be provided, there are a wide variety of known clutch surfaces which may provide tooth and/or frictional surfaces engagement to transfer rotational forces from the rear body 136 to the front slide 137 when the clutch surfaces are urged axially into each other. Other preferred surfaces include conical surfaces.

In use of a driver attachment with the clutch driver shaft 34 shown in FIGS. 9 to 11, when a screw with initially engaged by the bit of the driver shaft and a person using the screwdriver assembly pushes down on the screw, the downward pressure applied by the user compresses the spring 144 and the rear surfaces 148 of the front slide 137 engage the front surfaces 149 of the rear body 136 in the manner that they are coupled together for rotation. The coupled position is shown in cross section in FIG. 11. In this collapsed and engaged position, a screw 16 may be driven. On the screw being driven down into a workpiece, the depth stop mechanism including for example the rod 110 may be utilized to stop the rear body 136 from moving further towards the workpiece. The rear body 136 stops from further movement towards the workpiece at a position that the screw is almost fully driven into the workpiece. At this point, with further rotation of the driver shaft 34, as the screw is driven by the rotation of the driver shaft 34 further downward into the workpiece, the screw is drawn away from the rear body 136. Spring 144 to some extent assists in ensuring that the bit remains engaged in the head of the screw. Once the screw head is further advanced into the workpiece an axial distance greater than the axial height of the teeth 145 then the teeth 145 will become disengaged from the slots 146 and the rear body 136 will rotate driven by the power drill freely relative to the front slide 137. It is to be appreciated that by suitably selecting the depth at which the housing 18 and therefore the rear body 136 is stopped relative the work-piece, the front slide 137 can be permitted to disengage from rotation with the rear body 136 at a position that the screw becomes screwed into the workpiece a desired extent.

The preferred embodiment illustrated in FIG. 1 shows a screwdrive, assembly as including a known cartridge 9 which has a hinge door 150 permitting the insertion of a coil of the screwstrip 14 containing, for example, up to 1000 screws. It is to be appreciated that the use of such a cartridge is not necessary. For example, rather than provide such a cartridge, lengths of the screwstrip could be provided for example, one or two feet long which could merely be manually fed into the channelway 88 when desired.

The driver attachment may be constructed from different materials of construction having regard to characteristics of wear and the intended use of the attachment. Preferably, a number of the parts may be molded from nylon or other suitably strong light weight materials. Parts which are subjected to excessive wear as by engagement with the head of the screw may be formed from metal or alternatively metal inserts may be provided within an injection molded plastic or nylon parts. The provision of a removable nose portions 24 also has the advantage of permitting removable nose portion to be provided with surfaces which would bear the greatest loading and wear and which nose portions may be easily replaced when worn.

The screw feed advance mechanism carried on the nose portion has been illustrated merely as comprising a reciprocally slidable shuttle carrying a pawl. Various other screw feed advance mechanisms may be provided such as those which may use rotary motion to incrementally advance the screws. Similarly, the screws feed activation, mechanism comprising the lever 48 and the cam follower have been shown as one preferred mechanism for activating the screw feed advance mechanism yet provide for simple uncoupling as between the shuttle 96 and the lever 48. Other screw feed, activation means may be provided having different configurations of cam followers with, or without levers or the like.

In the preferred embodiment, the screwstrip 14 is illustrated as having screws extending normal to the longitudinal extension of the strip 13 and in this context, the channelway 88 is disposed normal to the longitudinal axis 52. It is to be appreciated that screws and other fasteners may be collated on a screwstrip in parallel space relation, however, at an angle to the longitudinal axis of the retaining strip in which case the channelway 88 would be suitably angled relative the longitudinal axis so as to locate and dispose each successive screw parallel to the longitudinal axis 52 of the driver shaft.

A preferred collated screwstrip 14 for use in accordance with the present invention is as illustrated in the drawings and particularly FIG. 3 and are substantially in accordance with Canadian Patent 1,054,982. The screwstrip 14 comprises a retaining strip 13 and a plurality of screws 16. The retaining strip 13 comprises an elongate thin band formed of a plurality of identical sleeves interconnected by lands 106. A screw 16 is received within each sleeve. Each screws 16 has a head 17, a shank 208 carrying external threads 214 and a tip 15. As shown, the external threads extend from below time head 17 to the tip 15.

Each screw is substantially symmetrical about a central longitudinal axis 212. The head 17 has in its top surface a recess 213 for engagement by the screwdriver bit.

Each screw is received with its threaded shank 208 engaged within a sleeve. In forming the sleeves about the screw, as in the manner for example described in Canadian Patent 1,040,600, the exterior surfaces of the sleeves come to be formed with complementary threaded portions which engage the external thread 214 of the screw 16. Each sleeve has a reduced portion between the lands 206 on one first side of the strip 13. This reduced strength portion is shown where the strip extends about each screw merely as a thin strap-like portion or strap 220.

The strip 13 holds the screw 16 in parallel spaced relation a uniform distance apart. The strip 13 has a forward surface 222 and a rear surface 223. The lands 106 extend both between adjacent screws 16, that is, horizontally as seen in FIG. 3, and axially of the screws 16, that is, in the direction of the longitudinal axes 212 of the screws. Thus, the lands comprise webs of plastic material provided over an area extending between sleeves holding the screws and between the forward surface 222 and the rear surface 223. A land 206 effectively is disposed about a plane which is parallel to a plane in which the axes 212 of all the screws lies. Thus, the lands 206 comprise a web which is disposed substantially vertically compared to the vertically oriented screws as shown in the figures. The lands 206 and the sleeves, in effect, are disposed as continuous, vertically disposed strip 13 along the rear of the screws 16, that is, as a strip 13 which is substantially disposed about a plane which is parallel to a plane containing the axes of all screws.

A preferred feature of the screwstrip 14 is that it may bend to assume a coil-like configuration due to flexibility of the lands 206, such that, for example, the screwstrip could be disposed with the heads of the screws disposed into a helical coil, that is, the plane in which all the axes 212 of the screws lie may assume a coiled, helical configuration to closely pack the screws for use. Having the lands 206 and sleeves as a vertically extending web lying in the plane parallel that in which the axes 212 permits such coiling.

The invention is not limited to use of the collated screwstrips illustrated. Many other forms of screwstrips may be used such as those illustrated in U.S. Pat. Nos. 3,910,324 to Nasiatka; 5,083,483 to Takaji; 4,019,631 to Lejdegard et al and 4,018,254 to DeCaro.

Reference is now made to FIGS. 12 to 22 illustrating a second embodiment of a removable nose portion 24 which is adapted for substitution with the nose portion 24 illustrated in FIGS. 1 to 6. Throughout FIGS. 12 to 22, similar reference numbers are used to refer to similar elements in FIGS. 1 to 11. For simplicity, the nose portion 24 shown in FIGS. 12 to 22 is shown merely in the context of the nose portion and/or with a screwstrip 14 including retaining strip 13 and screws 16. Other elements such as the shuttle 96, the shuttle pawl 99, the lever 48, the drive shaft 24, the bit 122 and the workpiece 124 are not shown for the purposes of simplicity. However, operation and interaction of various parts is substantially the same.

The nose portion 24 of FIGS. 12 to 21 is identical to the nose portion 24 of FIGS. 1 to 6 other than in the configuration of a passageway for the screwstrip radially through the guide tube 75 from the screw access opening 86 to the exit opening 87.

In FIGS. 1 to 6, the guide tube 75 has an outboard side which is completely cut away between the screw access opening 86 and the exit opening 87. In FIGS. 12 to 22, the guide tube 75 is not completely cut away on its outboard side but rather has a continuous portion 382 of its outer wall which separates the screw access opening 86 from the exit opening 87 on the outboard side of the guide tube 75. As used herein, the outboard side is the side to which the strip 13 is deflected when a screw 16 is separated from the screwstrip 14.

Figure 18:
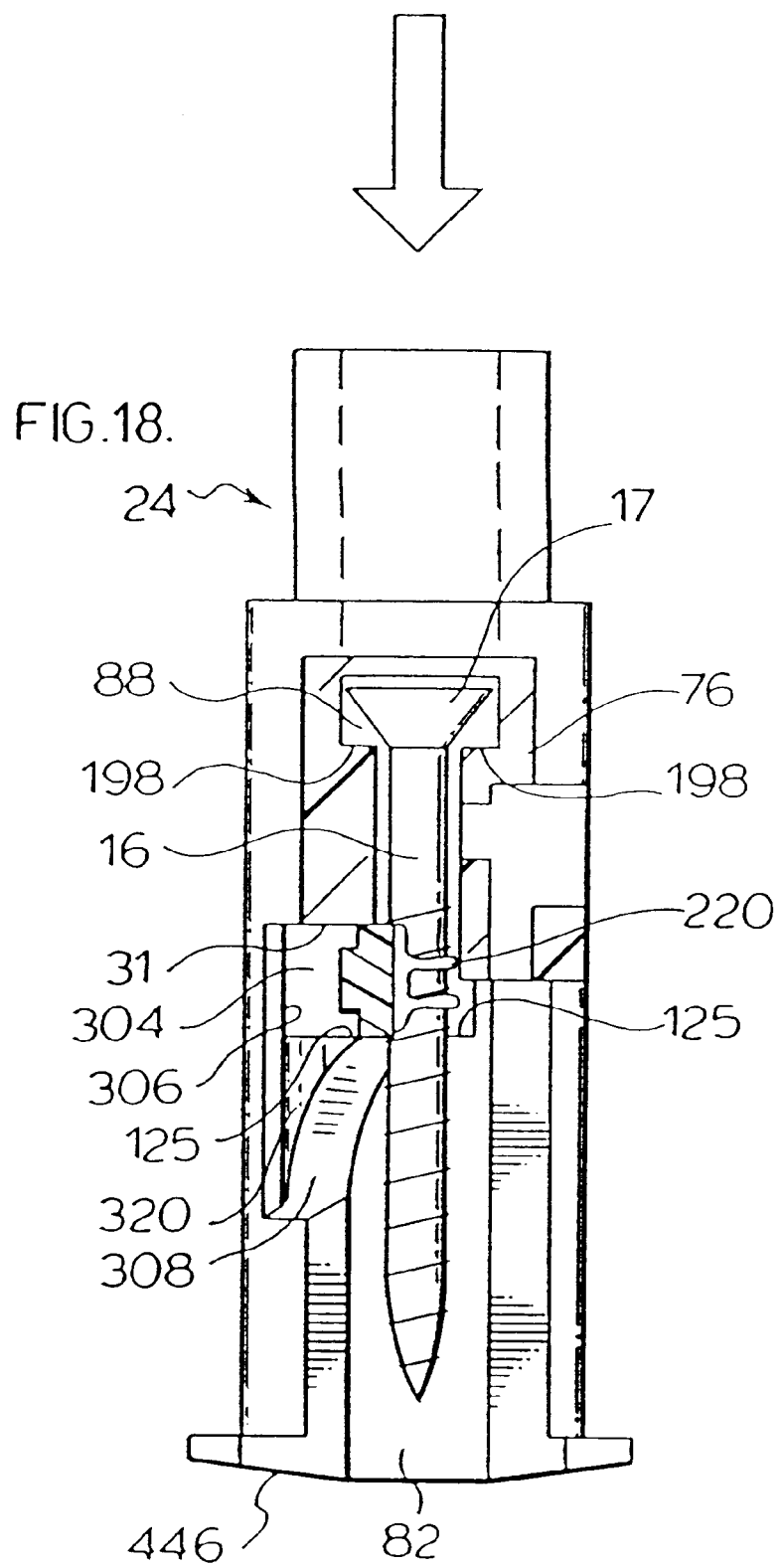
FIG. 18 is a cross-sectional side view of the nose portion of FIG. 14 along vertical section 18–18'.
Figure 19:
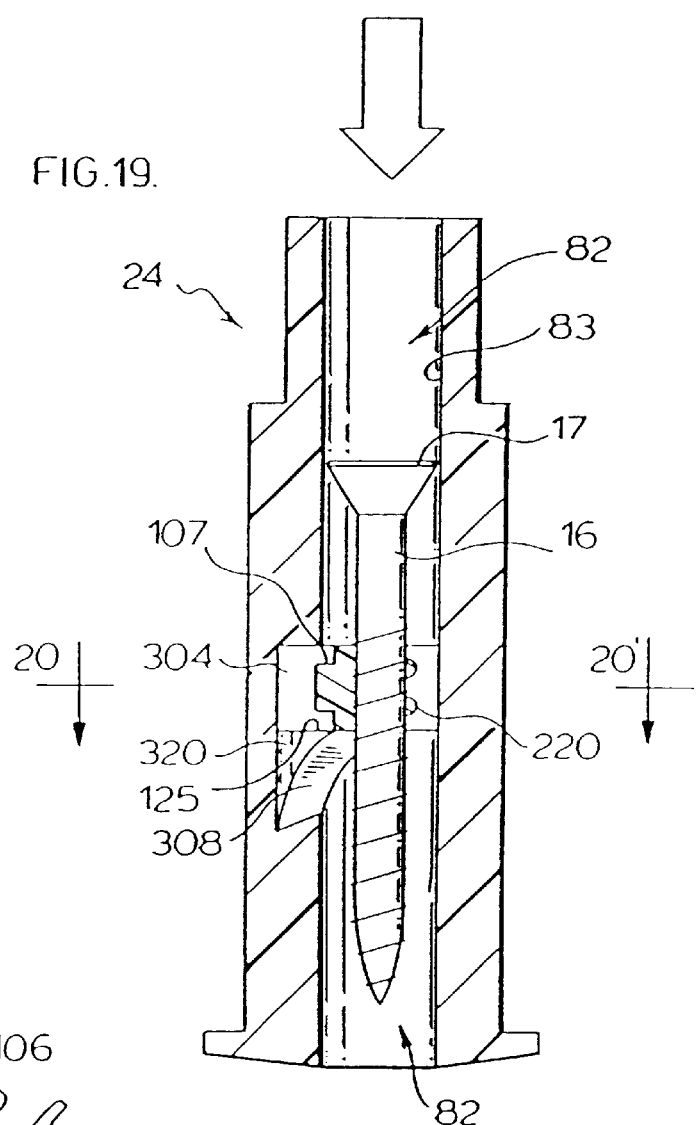
FIG. 19 is a vertical cross-section of the nose portion of FIG. 14 along vertical cross-section 19–19'.
Figure 20:
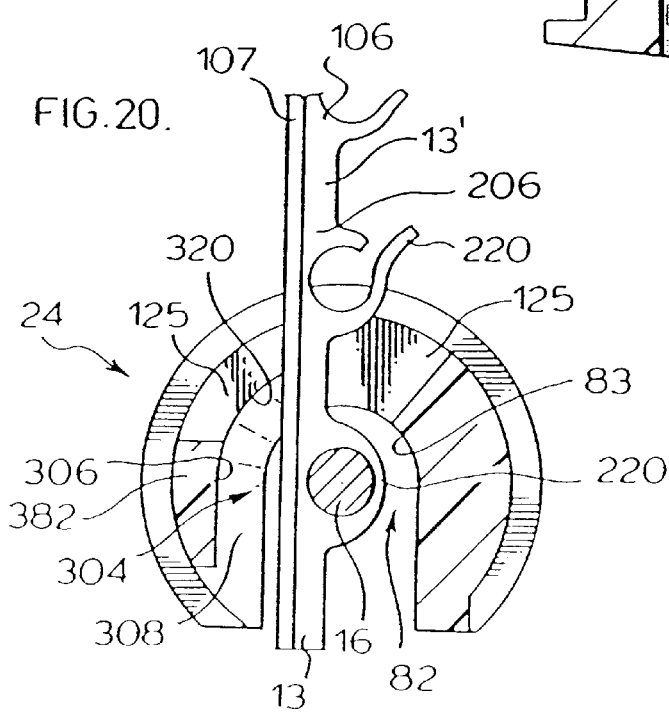
FIG. 20 is a horizontal cross-section along section line 20–20' of FIG. 19.

To accommodate deflection of the strip 13 away from a screw 16 towards the outboard side, the passageway which extends from the screw access opening or entranceway 86 to the exit opening or exitway 87 is provided on its outboard side with a lateral strip receiving slotway 304 cut to extend to the outboard side from the cylindrical guideway 82. The slotway 304, as best seen in FIGS. 18, 19 and 20, is bounded on the outboard side by side surface 306, at its forward end by ramped surface 308 and forward surface 125, and at its rear end by rear surface 312. FIG. 20 shows the side wall 83 of the guideway 82 and with the side surface 306 of the slotway 304 spaced towards the outboard side by the width of the ramped surface 308.

The access opening 86 forms an entranceway for the screwstrip 14 generally radially into the guideway 82 on one side. The exit opening 87 forms an exitway for portions of the strip 13 from which screws 16 have been driven, such portions being referred to as the spent strip 13'.

The exit openings or exitway 87 is shown as adapted to encircle the spent strip 13' with the exitway 87 bordered by rearwardly directed forward surface 125, forwardly directed rear surface 312, inboard side surface 314 and outboard side surface 316.

As seen in FIGS. 12 and 13, ramped surface 308 is an axially rearwardly directed surface which angles forwardly from the forward surface 125 towards the entranceway. As seen in FIG. 19, the ramped surface 308 also angles forwardly with increasing distance from the axis of the guideway 82.

The ramped surface 308 extends forwardly from forward surface 125 at juncture 218, with the ramped surface following the curvature of the side wall 83 as a ledge of constant width forming a curved sidewall portion 320 merging tangentially into side surface 306.

FIGS. 18, 19 and 20 illustrate the nose portion 24 with a screw 16 coaxially disposed within guideway 82 ready to be driven by the screwdriver bit. FIG. 18 is a cross-section through the screw feed channel element 76 and shows head 17 of the screw as positioned when the screw 16 has extended from the channelway 88, through the entranceway 86 and into the guideway 82. FIG. 18 also shows clearly how, in respect of screws in the channelway 88, the under surfaces of the head 17 are to be engaged on rearwardly directed shoulders 198. FIG. 19 is a cross-section through the axis of the guideway 82 and shows the guideway 82 having an inner diameter marginally greater than the diameter of the head 17 of the screw 16 to be driven therein and with the side wall 83 about portions of the guideway 82 adapted to engage the head 17 of the screw 16 and assist in coaxially locating the screw 16 in the guideway. As seen in FIGS. 18 and 19, the forward surface 222 of strip 13 engages the forward surface 125 of the exitway 87.

Figure 16:
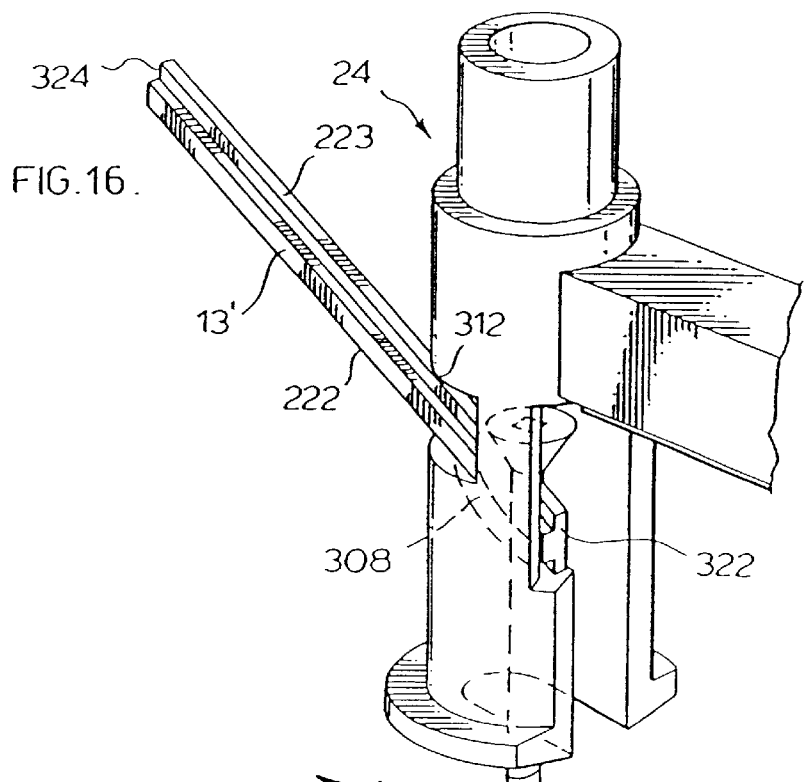
Figure 17:
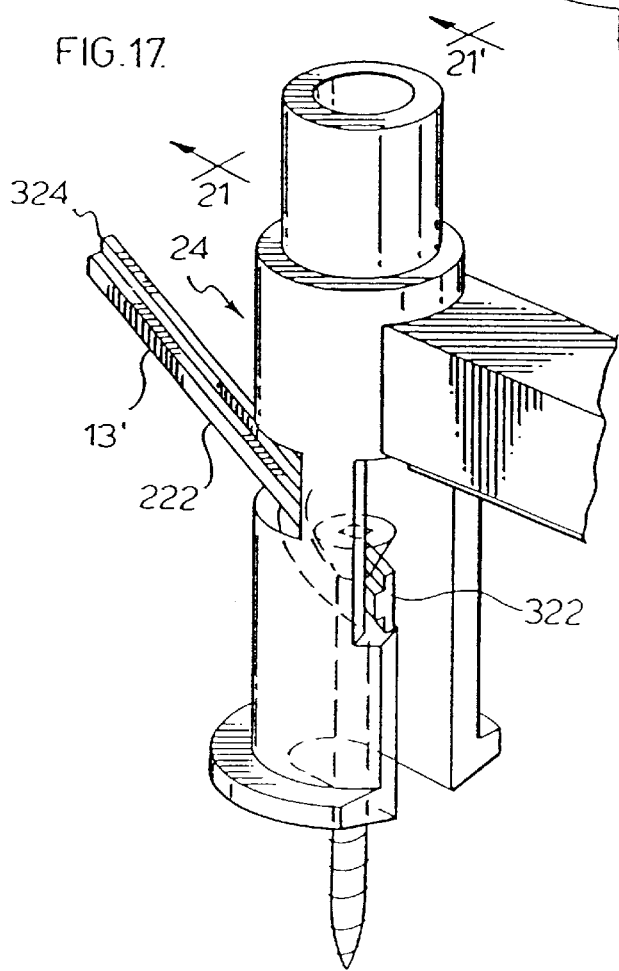

FIGS. 14, 15, 16 and 17 illustrate successive positions the screwstrip 14 assumes in driving the last screw 16 from the strip 13. FIG. 14 shows the position the last screw assumes when advanced into the guideway 82 by the shuttle 96 (not shown). The screw 16 of FIG. 14 is subsequently engaged by the bit 122 of the driver shaft 34 (not shown) to be rotated and pushed forwardly, whereby the screw 16 rotates within the strip 13 toward assuming the position shown in FIG. 15 with the head 17 of the screw 16 near to engaging the strip 13. With continued downward movement of the screw from the position of FIG. 15, the underside of the head 17 exerts downward pressure on the strip 13, with the strip 13 to pivot about the radially inner edge of the forward surface 125 such that the strip 13 comes to have its terminal end 322 drawn downwardly with the strip to assume the angled orientation as shown in FIG. 16.

The extent to which the strip may pivot about the radially inner edge of the forward surface 125 may be limited by the engagement of the rear surface 223 of the strip with the rear surface 312 of the exitway 87. The ramped surface 308 preferably is selected to angle forwardly from the forward surface 125 such that the ramped surface 308 is below, preferably only marginally below, the forward surface 222 of the strip 13 and disposed at substantially the same angle as the forward surface 222 of the strip 13.

Figure 21:
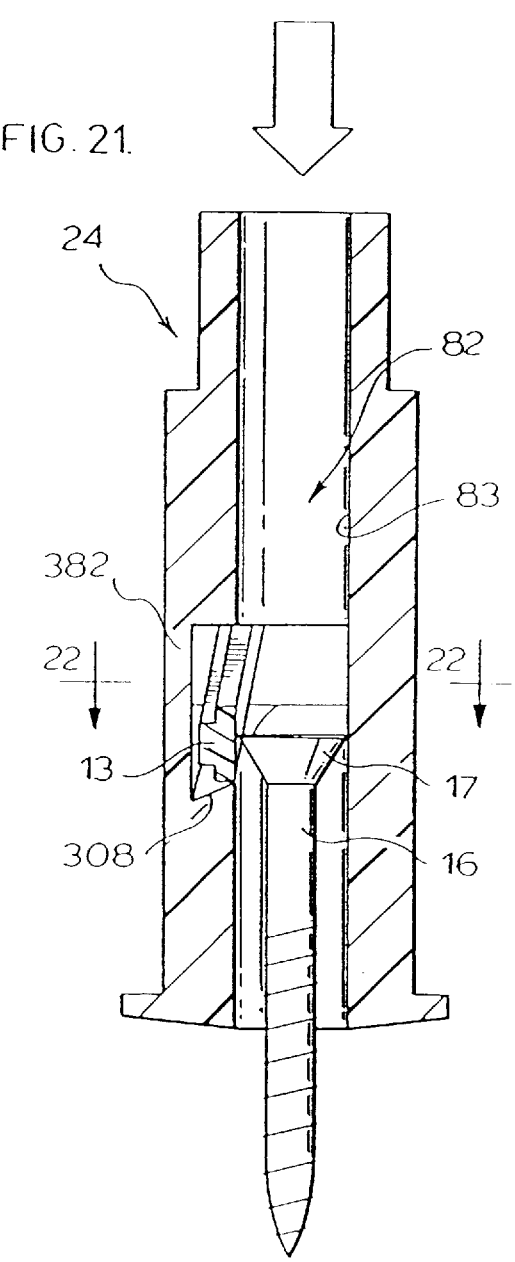
FIG. 21 is a vertical cross-section of the nose portion of FIG. 17 along vertical section line 21–21'.

In FIG. 16, the screw head 17 urges the strip 13 downwardly into the angled configuration shown with the straps 220 continuing to extend about the shaft of the screw but becoming tensioned and/or stretched. With further driving of the screw 16 forwardly, with the strip 13 being retained in the angled position against further forward movement, the forward movement of the head 17 breaks the straps 220 and the head 17 pushes the strip 13 laterally to the outboard side in the head 17 passing forwardly in the guideway 82 past the strip 13. As seen in FIG. 21, the strip 13 is located outboard of the guideway 82 and screw 16 in the slotway with head 17 of the screw free to pass forwardly there past in the guideway.

Figure 22:
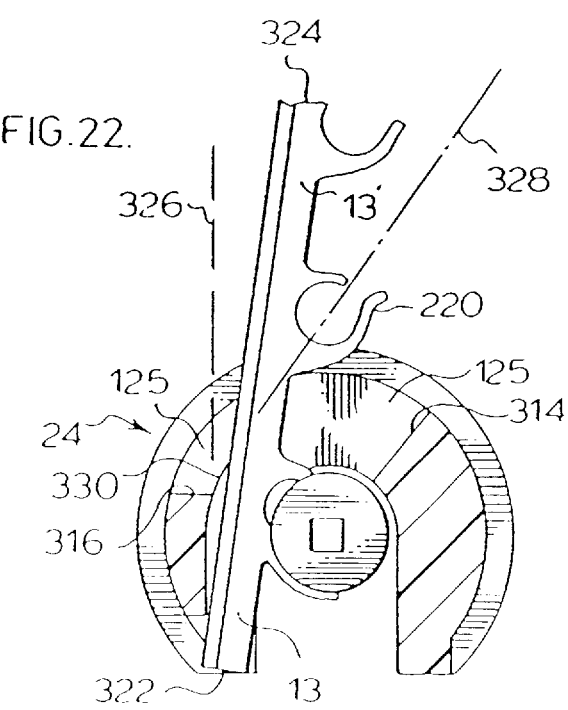
FIG. 22 is a cross-section along section line 22–22' in FIG. 21.

FIG. 22 is a top cross-sectional view of FIG. 21. FIG. 22 shows the strip 13 as deflected to the outboard side into the slotway. FIG. 22 also shows the strip 13 as having its terminal end 322 located towards the outboard side compared to the leading end 324 of the spent strip 13'. The spent strip 13' can adopt various positions where it exits the exitway 87. The entire strip 13' can assume a more outboard position as with the strip's outboard surfaces assuming the position of the dotted line 326 in FIG. 22. The entire strip 13' can assume a position in which its leading end 324 extends more inboard, as with the strip's outboard surfaces, assuming the position of the dotted line 328 in FIG. 22, with the spent strip 13' to extend diagonally through the exitway 87.

With the inner edge 330 of forward surface 125 curving rearwardly as seen in FIG. 22, engagement between the inner edge 330 and the forward surface 222 of the strip tends to pivot the strip to move its terminal end 322 to the outboard side which is advantageous to assist in urging the strip 13 into the slotway.

As best seen in FIG. 21, the ramped surface 308 angles forwardly with increased radius from the axis of the guideway. This assists in engagement between the ramped surface 308 and the forward surface 222 of the strip tending to urge the strip 13, or at least the strip's forward surface 222, sideways towards the outboard side and away from the screw 16 as is advantageous to reduce the likelihood of jamming of the strip under the head 17 of the screw as between the head 17 and the side wall 83.

Figure 23:
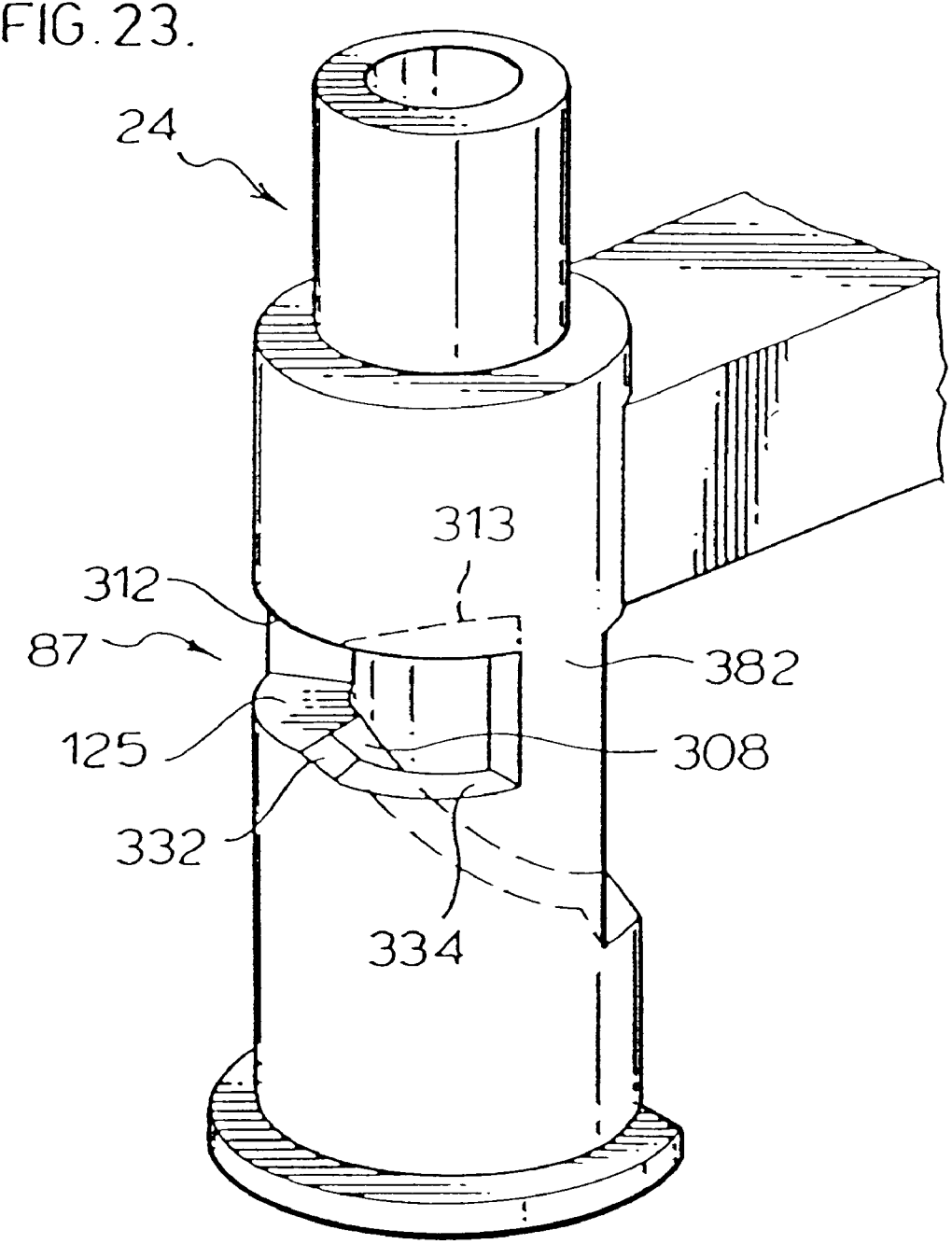
FIG. 23 is a schematic pictorial view similar to FIG. 13 but of a third version of a removable nose portion.

FIG. 23 shows a third embodiment of a nose portion 24 identical to the nose portion of FIG. 13 but in which the forward surface 125 towards the outboard side angles forwardly as an angled surface portion 332 initially at an angle similar to that of ramped surface 308, then merging into a surface portion 334 forward of surface 125.

On the strip 13 being drawn downwardly into the angled configuration as shown in FIG. 16, the angled surface portion 332 and the more forward surface portion 334 assist in urging the strip 13 towards the outboard side and into the slotway. The rear surface 312 of the exitway 87 could also be configured such that when the strip 13 is angled upwardly, the engagement between the rear surface 232 of the strip 13 and the rear surface 312 may urge the strip 13 towards the outboard side. FIG. 22 shows in dotted lines as 313 an alternate location of rear surface 312 which angles rearwardly toward the outboard side.

In FIGS. 14 to 22, the screwstrip 14 has been shown in a preferred form for screwstrips which are to comprise discrete length segments. The strip, as seen in FIGS. 12 and 20, has lands 106 of relatively constant cross-section throughout the length of the strip, with an enlarged flange 107 extending along the outboard side of the strip. This structure and particularly the enlarged flange 107 assists in making the strip self-supporting, that is, so that a segment will support the weight of the screws against bending. Flange 107 extends in the axial direction of the screw at least half the height of the lands. The strip 13 has been shown with a terminal end 322 which typically would extend from the last screw, about one half the distance between screws.

The strip 13 typically would be of a length of at least six inches and may be very long in the case of a coiled screwstrip. The leading end 324 is shown at a location where the strip 13 has ceased to be drawn in the drawings.

The nose portion 24 is shown as removable for use in an assembly as illustrated. It is to be appreciated that the particular features of the exitway, entranceway and guideway specifically disclosed to assist in driving the last screw in a strip could be used in other guide tubes such as those which are not removable and which may or malt not have an associated channelway.

The driver attachment 12 in accordance with this invention and the nose portion 24 described herein are particularly adapted for driving screwstrips 14 in the form of short segments, preferably in the range of about six to eighteen inches in length One preferred length is about twelve inches so as to hold, for example, about 32 screws of, for example, drywall screws or wood screws. To provide each segment with sufficient rigidity to be self-supporting, it is preferred to provide the strip 13 to have increased dimensions normal the axis of the screw on the outboard side of the screws as, for example, with the lands 206 extending as a continuous web along the outboard side of the screws as seen in FIG. 20. Reinforcing rib or flange 107 may be provided along the entire length of the lands 206 as seen in FIGS. 19 and 20. Such a reinforcing flange 107 or rib is of assistance in maintaining the axis of the screws in the same plane against coiling. The enlarged slotway in the nose portion of FIG. 12 is readily adapted to accommodate strips with such lands 206 and ribs 336 of increased width.

When, as shown in FIG. 14, the last screw 16 in a strip is located in the guideway, the fact that the exitway 86 encloses the spent strip 13' prevents the strip from rotating about the axis of the guideway to an orientation in which the screw 16 might be able to drop out of the guideway or the screw when driven is increasingly likely to jam. The spent strip 13' may extend from the exitway 87 at various angles limited only by the location of the side surfaces 314 and 316. Surface 314 extends radially away from the guideway and towards the inboard side.

The configuration of FIGS. 12 to 23 is advantageous to better ensure that the last screw 16 in any screwstrip 14 is driven and to generally assist in reducing the likelihood of any screw 16 being driven becoming jammed in the guideway with the strip 13.

Preferred strip segments for use with the drive attachment in accordance with this invention are as shown in FIG. 12, segments of discrete length in which the axis of all strips lie in the same flat plane and in which the heads 17 of the screws are all located in a straight line.

Figure 24:
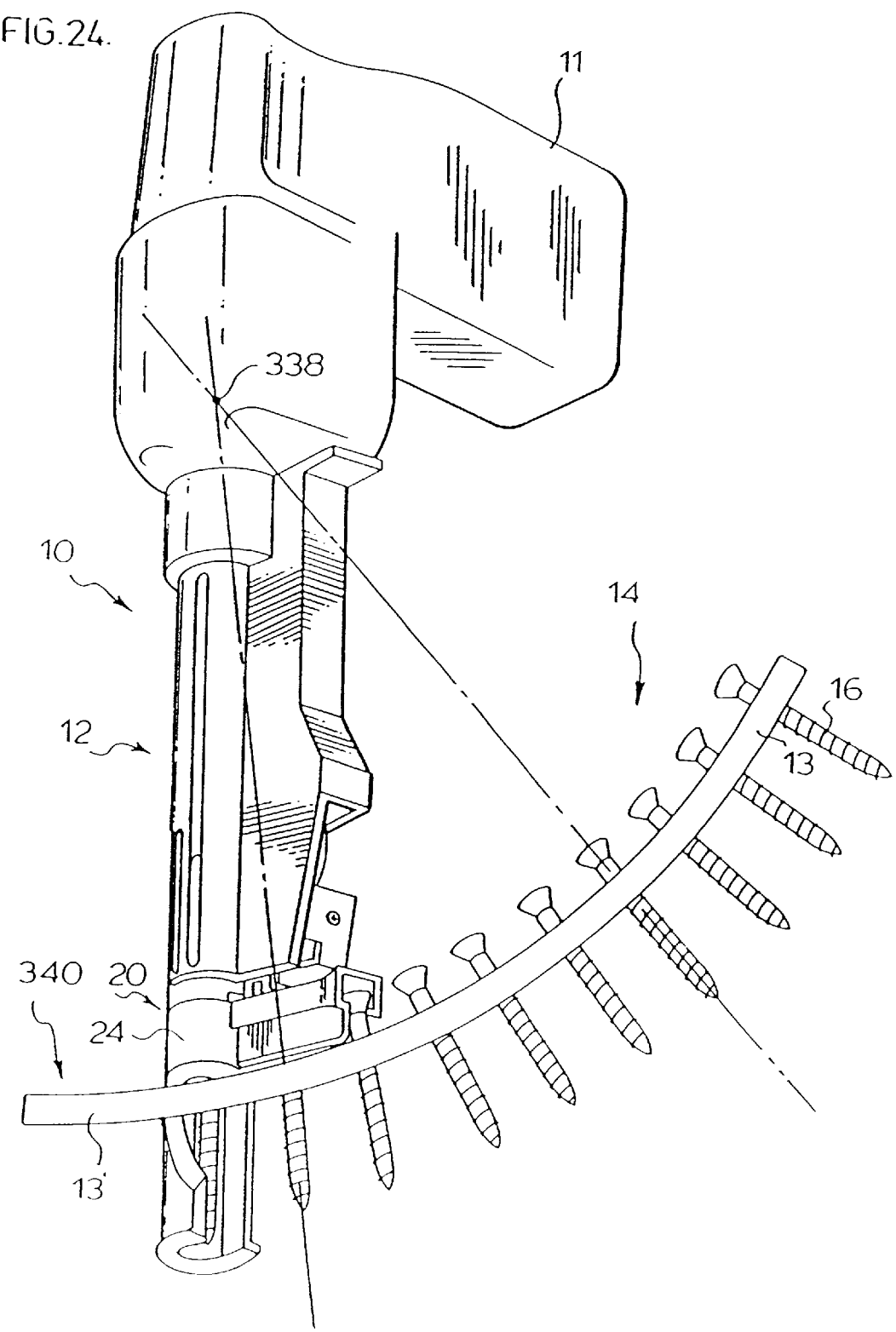
FIG. 24 is a pictorial view of a power screwdriver similar to that in FIG. 1 but driving a screwstrip of fixed length having a curved configuration.

FIG. 24 schematically shows a driver assembly similar to that in FIG. 1 but adapted to drive a screwstrip of a segment 340 of discrete length, but which is curved in the sense that the heads (and tips) of the screws lie in a curved line at a constant radius from a point 338. Preferably, all of the axis of the screws lie in the same plane. Each screw 16 preferably extends radially from point 338. The advantage of the curved discrete segment 340 is that the tips of screws 16 which are yet to be driven are spaced further rearward from a workpiece than tips of screws which are all in the same straight line. Having the tips of screws 16 spaced from the workpiece can be of assistance in preventing the tips of screws not yet driven from marking the surface of a workpiece.

A preferred radius of curvature may be in the range of twelve to thirty-six inches. Depending upon the curvature of the segment 340, the screw feed channel element 76 and its channelway 88 may be adapted to correspondingly adopt a similar radius of curvature or have sufficient space to accommodate both straight and curved strips.

Reference is now made to FIGS. 25 to 28 showing a modified form of a canister 400 to contain a coil of a collated screwstrip 14 and a system to mount the canister 400 to the driver attachment. In FIGS. 25 to 28, the same reference numbers are used to refer to the same elements as in the other figures.

Figure 25:
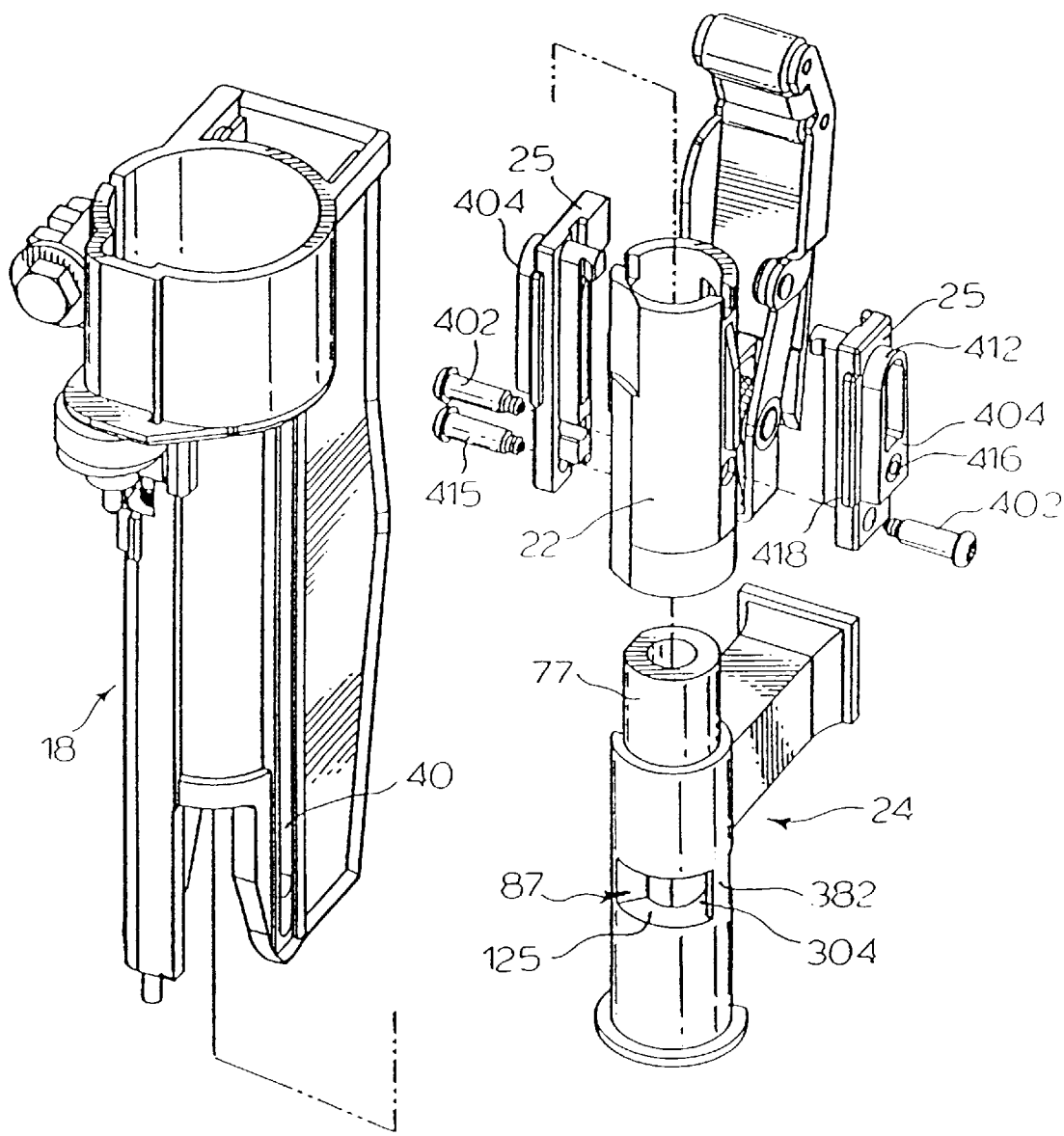
FIG. 25 is an exploded pictorial front view similar to FIG. 2 but of a second embodiment of driver attachment in accordance with this invention.

FIG. 25 illustrates an exploded view of the housing 18 and slide body components similar to the view shown in FIG. 2. The individual elements of the two embodiments are very similar. FIG. 25 shows the use of a nose portion 24 with an enclosed exit opening 86 and with the guide tube having the axially extending continuous portion 302 outboard of the passageway to receive the strip. The support surface 125 is shown to be normal the axis of the guideway.

Figure 26:
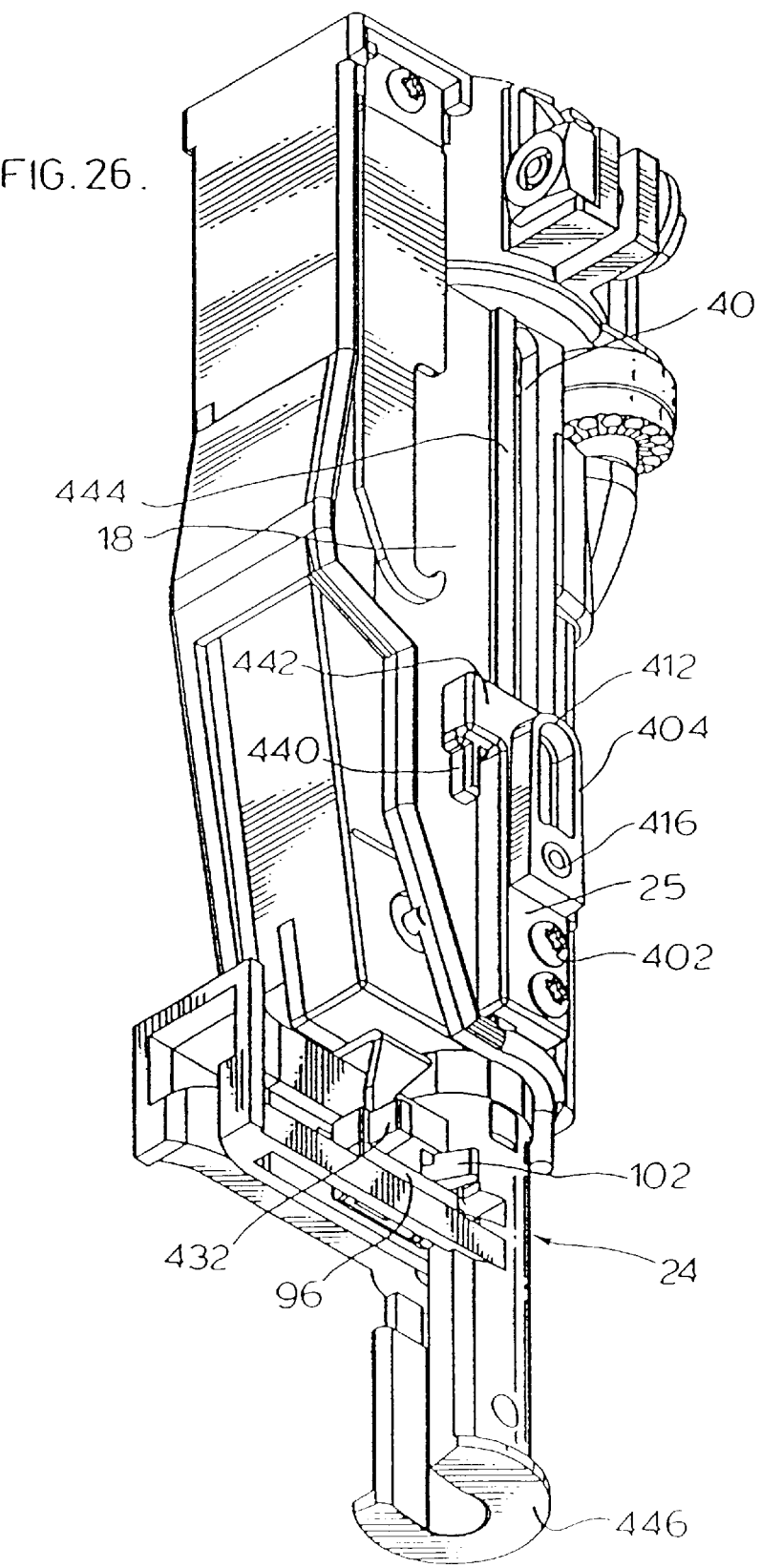
FIG. 26 is a rear view of the components of the driver attachment of FIG. 25 assembled.

Reference is made in FIGS. 25 and 26 to the slide stops 25 which are secured to the rear portion 22 of the slide body by bolts 402 such that the slide stops 25 slide in longitudinal slots 40 on each side of housing 18 to key the rear portion to the slide body and to prevent the slide body being moved out of the housing past a fully extended position.

Each slide stop 25 carries a coupling shoe generally indicated 404 by which a canister 400 may be mounted to the driver attachment. The canister 400 is shown in FIGS. 27 and 28 to include a bracket 406 with two spaced parallel arms 408 and 410. Each arm 408 and 410 is adapted to be secured to a coupling shoe 404 on the slide stops 25. In particular, the arms 408 and 410 have slots (not shown) in their inner surfaces complementary to the shape and profile of the coupling shoe. These slots have an open forward end and a closed rear end complementary in profile to the curved rear end 412 of the coupling shoe 404. A bolt 414 extends through each of arms 408 and 410 into a nut 416 in each shoe 404 to secure each arm to its respective shoe 404. Each shoe 404 has a longitudinal rib 418 spaced from the surface of the housing 18 and a keyway in the slots of the arms 408 and 410 is adapted to receive this rib 418 to positively provide against spreading of the arms apart independently of the bolts 414. A bolt 415 is provided to secure the rear portion 22 to the nose portion 24 with bolt 415 screwing through the shoe 404, and the rear portion 22 into the cylindrical portion 77 on the nose portion 24.

The bracket 406 carrying the canister 400 can readily be removed from the slide stops 25, for example, by removing bolts 414 and sliding the arms axially rearward relative the shoes 404.

The bracket 406 has a screw carrying tray 420 coupled to it. A mounting flange 422 on the bracket 406 carries a slide key 424 engaged slidably in a keyway 426 on the tray 420. By tightening or loosening bolt 428, the tray 420 can be located at desired positions forwardly and rearwardly relative the longitudinal axis of the guideway. The tray is preferably positioned such that coiled screws sitting with their tips on the bottom surface 430 of the tray have their heads 17 disposed at the same plane as heads of screws received in the channelway 88 of the screw feed channel element 76. The tray has a rearwardly extending side wall 431 directing screws to exit via an exit port 432 directly in line to the channelway 88.

The nose portion 24 and the canister 400 are both coupled to the rear portion 22 and thus move together as parts of the slide body 20. The tray and screwstrip are always in a constant aligned position relative the nose portion 24 in all positions in sliding of the slide body 20 relative the housing 18. This is in contrast with the cartridge 9 in FIG. 1 which is mounted to the housing 18 and the screwstrip 14 must flex with each cycle of in and out sliding of the housing 18 relative the slide body 20.

FIG. 26 shows an advantageous configuration for the shuttle 96 in being provided with a fixed post 432 opposed to the manual release arm 102 to permit pivoting of the release arm 102 by drawing the release arm 102 towards the fixed post 432 by pinching them between a user's thumb and index finger.

Mounting of the canister 400 to the slide stops 25 permits the slide body 18 to be fully retractable within the housing without the screwstrip being flexed in each reciprocal stroke.

As seen in FIG. 26, a stop member 40 is mounted to housing 18 to engage a stop flange 442 on the slide stop 25 and provide increased surfaces to bear stopping load forces. A longitudinal rib 444 extends along the side of housing 18 and a complementary slotway is provided in each stop flange 442 closely sized thereto to assist in longitudinal parallel sliding and engagement.

Referring to FIG. 18 and 26, the guide tube 75 has a forward surface 446 which is a segment of a spherical surface of a radius centered on the axis of the guideway such that screws being driven may be driven into a workpiece a relatively constant distance even if the guideway is disposed at a slight angle to the normal relative the workpiece.

The preferred slotway illustrated in FIGS. 12 to 22 shows the slotway bounded forwardly by the ramped surface 308 which slopes relative the axis of the guideway both forwardly towards the entranceway and with increased radial distance from the axis of the guideway. It is to be appreciated that the slotway may be bounded forwardly by surfaces normal the axis of the guideway as, for example, an extension of support surface 125 and such a configuration is shown in FIG. 25.

While the invention has been described with reference to preferred embodiment, the invention is not so limited. Many variations and modifications will now occur to persons skilled in the art. For a definition of the invention, reference is made to the appended claims.

I claim:

1. An apparatus for driving with a power driver a screwstrip comprising threaded fasteners such as screws or the like, which are joined together in a strip comprising:

a housing;

an elongate drive shaft for operative connection to a power driver for rotation thereby and defining a longitudinal axis;

a slide body coupled to the housing for displacement parallel to the axis of the drive shaft between an extended position and a retracted position;

a spring biasing the slide body forwardly relative to the housing parallel the axis to the extended position;

the slide body having
  (a) a guide channel for said screwstrip extending through said slide body;
  (b) a guideway to locate successive of the screws advanced via the guide channel to be axially in alignment with said drive shaft for engagement in driving of the screws from the guideway by the drive shaft; and
  (c) a screw feed activation mechanism coupled between the slide body and the housing whereby displacement of the slide body relative the housing between the extended position and the retracted position advances successive screws;

the housing comprising an elongate hollow tubular member having a side wall about a central elongate interior cavity extending longitudinally of the tubular member parallel the axis and open at an open forward end;

the side wall having two elongate slots therethrough open to the central cavity and extending longitudinally of the interior cavity parallel the axis, the slots located on the side wall at circumferentially spaced locations diametrically opposite each other relative the axis;

the side wall having an inwardly directed inner surface open to the interior cavity and an outwardly directed outer surface;

a shoe member slidably received in each of the slots for guided longitudinal sliding parallel the axis guided within its respective slot;

each shoe member fixedly, removably secured to the slide body to guide the slide body in the tubular member for sliding parallel the axis against relative rotation of the slide body and the tubular member about the axis;

each slot is formed in the side walls of the tubular member with elongate guide surfaces forming each side of the slot extending parallel the axis;

each shoe member having an elongate rib-like inner portion extending radially inwardly into the slot with elongate side surfaces of the inner portion extending parallel the axis bearing on the guide surfaces on each side of the slot.

2. An apparatus as claimed in claim 1 wherein:

a first forward stop member is provided on the side wall proximate one of the slots;

a second forward stop member is provided on one of the shoe members for engagement with the first forward stop member to limit sliding of the slide body forwardly relative the housing to the extended position.

3. An apparatus as claimed in claim 2 wherein the first forward stop member provides a rearwardly directed stop surface;

the second forward stop member provides a forwardly directed stop surface adapted on relative sliding of the slide body forwardly relative the housing to engage the rearwardly directed stop surface of the first stop member.

4. An apparatus as claimed in claim 1 wherein the slide body is removable from the interior cavity of the tubular member by sliding forwardly out of the open forward end of the cavity when the shoe members are removed.

5. An apparatus as claimed in claim 4 wherein each the shoe member is removably secured to the slide body by threaded fasteners which extend radially relative the axis through the respective slot in the side wall of the tubular member into engagement with the slide body.

6. An apparatus as claimed in claim 1 wherein each shoe member engages the outer surface of the wall adjacent its respective slot.

7. An apparatus as claimed in claim 1 wherein the side wall carries adjacent at least one of the slots an elongate raised rib extending parallel the slot, each shoe member having a slotway to receive the rib therein.

8. An apparatus as claimed in claim 6 wherein the slide body carries a radially outwardly extending projection which extends outwardly into an opening in the inner portion of the shoe member located within one of the slots to assist in coupling the slide body to the shoe member against relative axial movement.

9. An apparatus as claimed in claim 1 wherein the shoe member carries a first catch member having a forwardly directed catch surface to extend through the slots and engage with a second catch member having a rearwardly directed catch surface carried on the slide body.

10. An apparatus as claimed in claim 9 including a removable threaded fastener extending radially through each shoe member within the respective slot into the slide body to secure the shoe member to the slide body with the forwardly directed catch surface and the rearwardly directed catch surface in engagement.

11. An apparatus as claimed in claim 6 wherein the slide body has radially outwardly directed outer surfaces and the rib-like inner portion of the shoe member has a radially inwardly directed surface;

the shoe member secured to the slide body with the outwardly directed outer surface of the slide body engaged by the radially inwardly directed surface of the inner portion of shoe member fixed against relative radial movement of the shoe member relative the slide body, with portions of side wall of the tubular member adjacent the slot sandwiched radially between the slide body and an outer portion of the shoe member.

12. An apparatus as claimed in claim 6 wherein the slide body having outwardly directed outer surfaces, portions of the inner surfaces of the side wall comprise bearing surfaces complementary to outer surfaces of the slide body for guiding the slide body in relative coaxial sliding of the slide body in the central cavity.

13. An apparatus as claimed in claim 12 wherein the inner surfaces of the side wall include part cylindrical surfaces coaxially about the axis of a first radius, the outer surfaces of the slide body include part cylindrical surfaces coaxially about the axis of a second radius marginally smaller than the first radius.

14. An apparatus as claimed in claim 12 wherein the part cylindrical surfaces extending coaxially about the axis over a circumferential extent of about 180°.

15. An apparatus as claimed in claim 6 wherein a first end portion of the side wall comprises a part cylindrical wall portion extending coaxially about the axis over a circumferential extent of about 180°, two opposite side portions of the side wall extend away from the part cylindrical wall portion parallel each other as straight portions ending at a second end portion of the side wall.

16. An apparatus as claimed in claim 15 wherein the slots are provided in the side wall in the two side portions.

17. An apparatus as claimed in claim 16 wherein the slots are provided where the side portions of the side wall extend from the first end portion.

18. An apparatus as claimed in claim 16 wherein in at least one of the side portions of the side wall between the slot therein and the second end portion of the side wall a cam slotway is provided opening into the interior cavity and providing camming surfaces for engagement by a cam follower carried on the slide body as an element of the screw feed activation mechanism.

19. An apparatus as claimed in claim 18 wherein the camming surfaces are disposed normal to the side portion of the side wall.

20. An apparatus as claimed in claim 18 wherein the cam follower is mounted for rotation about an axis normal to the side portion of the side wall.

21. An apparatus as claimed in claim 16 wherein the two side portions of the side wall are equally spaced on either sides of the axis as generally flat planar walls symmetrical relative to each other relative the axis about a plane passing therebetween.

22. An apparatus as claimed in claim 16 wherein the first end portion is symmetrical about the plane about which the side portions are symmetrical.

23. An apparatus as claimed in claim 1 wherein the guideway extends coaxially through the slide body coaxially about the axis;
the guide channel extending transverse to the axis and opening radially into the guideway on a first side of the guideway to feed successive screws held in the screwstrip into the guideway;
a screwstrip exitway opening outwardly from the guideway on a second side of the guideway opposite the first side via which exitway a strip from which screws have been removed by driving with the driver shaft may exit the guideway on advance of the screwstrip;
an exit slotway in the side wall extending rearwardly from the open forward end of the tubular member axially in line with the exitway to permit the strip from which screws have been removed to pass unhindered from the exitway through the side wall via the exit slotway when the slide body is retracted relative the housing toward the retracted position.

24. An apparatus as claimed in claim 23 including a guide channel slotway in the side wall extending rearwardly from the open forward end of the tubular member axially in line with the guide channel to permit the guide channel to extend through the side wall via the guide channel slotway when the slide body is retracted relative the housing toward the retracted position.

25. An apparatus as claimed in claim 23 wherein the guide channel extends transverse to the axis and away from the axis radially farther than the side wall, the slots extend forwardly to a forward blind end, the open forward end of the tubular member is axially forward of the forward blind end of the slots.

26. An apparatus as claimed in claim 23 wherein when the slide body is in the extended position relative the housing, the guide channel and screwstrip exitway are forward of the open forwarding of the side wall of the tubular member;
when the slide body is in the retracted position relative the housing, the guide channel and screwstrip exitway are rearward of the open forward end of the side wall of the tubular member;
on retraction of the slide body relative the housing from the extended position, the strap from which screws have been driven which extends radially out of the screwstrip exitway moves rearwardly in the exit slotway past the open forward end of the side wall of the tubular member and the guide channel moves rearwardly in the guide channel slotway past the open forward end of the side wall of the tubular member.

27. An apparatus as claimed in claim 1 wherein the housing substantially comprises a unitary element injection molded from a plastic material.

28. An apparatus as claimed in claim 27 wherein the slide body comprises a forward nose portion and a rear portion, the nose portion removably coupled to the rear portion;
the nose portion substantially comprises a unitary element formed from metal.

29. An apparatus as claimed in claim 28 wherein the rear portion of the slide body comprises a member formed of plastic material.

30. An apparatus as claimed in claim 28 wherein the rear portion and forward nose portion are removably secured together with the rear portion extending rearwardly into a forwardly opening socket in the rear portion and removable radially extended screws extending from the rear portion into the nose portion.

31. An apparatus as claimed in claim 30 wherein the rear portion carries a lever pivotably mounted to the rear portion intermediate front and rear distal ends of the lever;
the rear distal end of the lever carrying a cam follower;
a cam slotway provided in the side wall of the tubular member;
the cam follower received in the cam slotway whereby in moving between the retracted position and the extended position relative sliding of the slide body and housing pivots the lever.

32. An apparatus as claimed in claim 7 wherein each shoe member has an inner portion and an outer portion;
the outer portion outward of the outer surface of the wall with inwardly directed surfaces engaging the outer surfaces of the wall;
the inner portion extending from the outer portion inwardly via the slot into engagement with the slide body for fixedly removable securing to the slide body.

33. An apparatus as claimed in claim 32 wherein the outer portion having an inwardly directed surface carrying an inwardly directed opening to the slotway;
the slotway having on a first side on which the rib is carried first guiding surfaces extending parallel the axis and directed transversely to the axis away from the rib;
the rib having second guiding surfaces extending parallel the axis and directed away from the slotway;
the inner portion having first bearing surfaces for engagement with the first guiding surfaces the slotway having second bearing surfaces for engagement with the second bearing surfaces.

34. An apparatus as claimed in claim 33 including a threaded fastener extending through each shoe member via the inner portion within the slot into the slide body to removably secure the shoe member to the slide body.

35. An apparatus as claimed in claim 34 wherein the slide body carries a lever pivotably mounted to the slide body intermediate front and rear distal ends of the lever,
the rear distal end of the lever carrying a cam follower;
a cam slotway provided in the side wall of the tubular member;
the cam follower received in the cam slotway whereby in moving between the retracted position and the extended position relative sliding of the slide body and housing pivots the lever.

36. An apparatus as claimed in claim 35 wherein a first end portion of the side wall comprises a part cylindrical wall portion extending coaxially about the axis over a circumferential extent of about 180°, two opposite side portions of the side wall extend away from the part cylindrical end portion parallel each other as straight portions ending at a second end portion of the side wall;
the slots are provided in the side wall in the two side portions where the side portions of the side wall extend from the first end portion, in at least one of the side portions of the side wall between the slot therein and the second end portion of the side wall a cam slotway is provided opening into the interior cavity and providing camming surfaces for engagement by a cam follower carried on the slide body as an element of the screw feed activation mechanism.

37. An apparatus as claimed in claim 1 wherein a rear end of the housing comprises a rearwardly opening cylindrical socket adapted to frictionally engage a nose portion of a power tool, the socket coaxial to the axis.

38. An apparatus as claimed in claim 37 wherein the socket ends at a forward end at an annular base plate extending normal the axis with an opening extending forwardly from the base coaxially about the axis for passage of the driver shaft.

39. An apparatus as claimed in claim 1 wherein the housing carries at a rear end an elongate cylindrical tube which extends forwardly into the cavity coaxially about the axis from a rear end of the tube where the tube is joined to the housing to a distal forward end;

the tube having a central passageway coaxially about the axis through which the drive shaft extends.

40. An apparatus as claimed in claim 39 wherein

The tube having a forwardly directed shoulder which extends radially outwardly from the tube;

the spring comprises a coil spring received closely about the tube, the spring having a front end and a rear end;

the front end of the spring engaging the slide body;

the rear end of the spring engaging the shoulder.

41. An apparatus as claimed in claim 40 wherein the slide body includes a rearwardly directed spring socket opening rearwardly from the slide body about the axis, the spring socket ending at a rearwardly directed base surface with an opening extending forwardly therethrough coaxial with the axis for passage of the drive shaft; and the front end of the spring is received within the spring socket.

42. An apparatus as claimed in claim 41 wherein on retraction of the slide body to the retracted position, the tube extends forwardly into the spring socket with coils of the spring radially between the tube and interior side walls of the spring socket.

43. An apparatus as claimed in claim 42 wherein in the extended position, the front end of the tube is rearward of a rear opening to the spring socket.

44. An apparatus as claimed in claim 42 wherein rearward of the tube, the housing comprises a rearwardly opening cylindrical socket adapted to frictionally engage a nose portion of a power tool, the socket coaxial about the axis.

45. An apparatus as claimed in claim 1 wherein the housing includes a flange member extending normal the axis located near the rear of the housing and forming a rearward end of at least a portion of the cavity;

the axis extending through the flange member; the flange member having an opening therethrough coaxially about the axis for passage of the drive shaft through the axis;

a hollow spring supporting cylindrical tube member coaxial with the axis having a rear end supported on a forward surface of the flange member and extending forwardly to a distal front end of the tube member;

the spring comprising a coil spring disposed coaxially about the tube member radially outwardly thereof;

a hollow socket forming cylindrical wall member having a forward end supported on a rear surface of the flange member and extending rearwardly to a distal rear end of the wall member, the cylindrical wall forming a cylindrical socket coaxial with the axis.

46. An apparatus as claimed in claim 45 wherein the housing is a unitary element injection molded from plastic material.

47. An apparatus as claimed in claim 46 wherein the socket forming cylindrical wall has a circumferentially extending resilient tab portion joined to a remainder of the cylindrical wall at one fixed end and extending circumferentially to a free end.

48. An apparatus as claimed in claim 47 including a tightening mechanism to adjustably draw the free end of the tab portion circumferentially to reduce the circumference of the socket.

49. An apparatus as claimed in claim 1 including an adjustable rear stop mechanism to limit retraction of the slide body relative the housing;

the rear stop mechanism including a slide stop member on the slide body with a rearwardly directed stop surface;

a housing stop member on the housing with a forwardly directed stop surface to engage the rearwardly directed stop surface on the slide stop member; and an adjustment mechanism to adjust the axial location of the housing stop member;

the adjustment mechanism including an indexing dial mounted to the housing for manual rotation about a dial axis parallel the axis to change the relative axial location of the forwardly directed stop surface.

50. An apparatus as claimed in claim 49 wherein the indexing dial has a cylindrical disc portion coaxially about the dial axis with a radially outwardly directed surface accessible radially of the housing and adapted for manual engagement by a user to rotate the indexing dial.

51. An apparatus as claimed in claim 50 wherein the indexing dial is carried on the housing proximate a rear of the housing.

52. An apparatus as claimed in claim 50 wherein a rear end of the housing comprises a rearwardly opening cylindrical socket adapted to frictionally engage a nose portion of a power driver, the socket coaxial to the axis, the indexing dial carried on the housing proximate the socket.

53. An apparatus as claimed in claim 50 wherein the housing includes a flange member extending normal the axis located towards the rear of the housing at forming a rearward end of at least a portion of the cavity;

the axis extending through the flange member, the flange member having an opening therethrough coaxially about the axis for passage of the drive shaft through the axis;

a hollow spring supporting cylindrical tube member coaxial with the axis having a rear end supported on a forward surface of the flange member and extending forwardly to a distal front end of the tube member;

the spring comprising a coil spring disposed coaxially about the tube member radially outwardly thereof;

a hollow socket forming cylindrical wall member having a forward end supported on a rear surface of the flange member and extending rearwardly to a distal rear end of the wall member, the cylindrical wall forming a cylindrical socket coaxial with the axis;

the indexing dial rotatable about a dial axle member; and one end of the dial axle member received in a dial opening extending through the flange member coaxially of the dial axis.

54. An apparatus as claimed in claim 53 wherein the housing is a unitary element injection molded from plastic material.

55. An apparatus as claimed in claim 53 wherein the cylindrical wall has a circumferentially extending resilient tab portion joined to a remainder of the cylindrical wall at one fixed end and extending circumferentially to a free end; and a tightening mechanism to adjustably draw the free, end of the tab portion circumferentially to reduce the circumference of the socket.

56. An apparatus as claimed in claim 55 wherein other than the tightening mechanism and portions of the adjustment mechanism, the housing comprises a unitary element formed by injection moulding from plastic or nylon material.

57. An apparatus as claimed in claim 1 in combination with a plastic holding strip holding screws spaced in parallel side-by-side relation from each other;

the strip having joining lands which extend both between the screws and axially relative the screws.

58. An apparatus as claimed in claim 1 in combination with a plastic holding strip holding screws spaced in parallel side-by-side relation from each other;

the strip having joining lands which extend both between the screws and axially relative the screws;

the strip comprising spaced parallel sleeves interconnected by the lands with one screw received in each sleeve; and the sleeve having a reduced strength portion between the lands such that a screw on being threaded tip first into a workpiece is automatically separated from its sleeve while simultaneously maintaining the length of the strip substantially intact and while guiding the screw by threaded engagement of the screw in its respective sleeve.

59. An apparatus as claimed in claim 34 wherein the shoe members received within the slots retain the slide body in the tubular member against removal.

60. An apparatus as claimed in claim 44 wherein the housing substantially comprises a unitary element injection moulded from a plastic material.

61. An apparatus as claimed in claim 27 wherein the slide body carries a lever pivotably mounted to the slide body intermediate front and rear distal ends of the lever;

the rear distal end of the lever carrying a cam follower;

a cam slotway provided in the side wall of the tubular member, and the cam follower received in the cam slotway whereby in moving between the retracted position and the extended position relative sliding of the slide body and housing pivots the lever.

62. An apparatus as claimed in claim 32 including a bracket member outwardly of the housing removably mounted to outwardly directed surfaces of both shoe members and carrying an accessory thereon for sliding with the slide body externally of the housing.

63. An apparatus as claimed in claim 62 wherein said accessory is a canister holding a coil of the screwstrip feeding from the canister to the guideway.

64. An apparatus for driving with a power driver a screwstrip comprising threaded fasteners such as screws or the like, which are joined together in a strip comprising:

a housing;

an elongate drive shaft for operative connection to a power driver for rotation thereby and defining a longitudinal axis;

a slide body coupled to the housing for displacement parallel to the axis of the drive shaft between an extended position and a retracted position;

a spring biasing the slide body forwardly relative to the housing parallel the axis to the extended position;

the slide body having
 (a) a guide channel for said screwstrip extending through said slide body;
 (b) a guideway to locate successive of the screws advanced via the guide channel to be axially in alignment with said drive shaft for engagement in driving of the screws from the guideway by the drive shaft; and
 (c) a screw feed activation mechanism coupled between the slide body and the housing whereby displacement of the slide body relative the housing between the extended position and the retracted position advances successive screws;

the housing comprising an elongate hollow tubular member having a side wall about a central elongate interior cavity extending longitudinally of the tubular member parallel the axis and open at an open forward end;

the side wall having two elongate slots therethrough open to the central cavity and extending longitudinally of the interior cavity parallel the axis, the slots located on the side wall at circumferentially spaced locations opposite each other relative the axis;

the side wall having an inwardly directed inner surface open to the interior cavity and an outwardly directed outer surface;

a shoe member slidably received in each of the slots for guided longitudinal sliding parallel the axis guided within its respective slot;

each shoe member carried by the slide body to guide the slide body in the tubular member for sliding parallel the axis against relative rotation of the slide body and the tubular member about the axis;

each slot is formed in the side walls of the tubular member with elongate guide surfaces forming each side of the slot extending parallel the axis;

each shoe member having an inner portion in the slot with side surfaces of the inner portion bearing on the guide surfaces on each side of the slot.

65. An apparatus as claimed in claim 64 wherein the inner portion is an elongate-rib-like inner portion and the side surfaces of the inner portion are elongate side surfaces extending parallel the axis.

* * * * *